United States Patent [19]
Nakagawa

[11] Patent Number: 5,619,696
[45] Date of Patent: Apr. 8, 1997

[54] PROGRAM CACHE APPARATUS WHICH ASSOCIATES THE PHYSICAL ADDRESS OF A PHYSICAL PAGE WITH BOTH THE LOGICAL ADDRESS IN A PROGRAM CACHE SPACE AND THE LOGICAL ADDRESS IN A PROCESS SPACE

[75] Inventor: Jun Nakagawa, Kawasaki, Japan

[73] Assignee: Fujitsu Limited, Kawasaki, Japan

[21] Appl. No.: 293,593

[22] Filed: Aug. 22, 1994

[30] Foreign Application Priority Data

Nov. 29, 1993 [JP] Japan .................................. 5-298585

[51] Int. Cl.⁶ .................................................. G06F 9/42
[52] U.S. Cl. ............................................ 395/670; 395/403
[58] Field of Search ............................. 395/403, 488, 395/700, 650

[56] References Cited

U.S. PATENT DOCUMENTS 5,175,842  12/1992  Totani .................................. 395/488
5,475,840  12/1995  Nelson et al. ....................... 395/700

FOREIGN PATENT DOCUMENTS 4-205535  7/1992  Japan .

OTHER PUBLICATIONS

Goodman, J.R. "Coherency for Multiprocessor Virtual Address Caches." Proceedings of the Second International Conference on Architectural Support for Programming Languages and Operating Systems. IEEE. 1987. Oct. 1987.

Primary Examiner—Jack A. Lane
Assistant Examiner—Kevin Verbrugge
Attorney, Agent, or Firm—Staas & Halsey

[57] ABSTRACT

When a central processing unit requests a program, the central processing unit loads a program from an external storage device onto a physical page. The physical address of the physical page where this program is stored is associated with a logical address in a program cache space. Information about addresses in this program is translated in this program cache space. Then, the physical address of the physical page where the program is loaded is associated with a logical address in a process space. Therefore, the central processing unit can thereafter access the program in the process space without copying a physical page for address alteration. When the central processing unit executes writing on the program in the process space later, the physical page is copied.

13 Claims, 21 Drawing Sheets

BEFORE COUPLING

AFTER LINKAGE

FIG.17

SYSTEM LIBRARY

ADDRESS 10002000 → SUBROUTINE A'

FIG.18

LINKAGE TABLE IN PROGRAM B

| SEQUENCE OF SYMBOL CHARACTERS | NUMBER OF PROCESSES IN INSTRUCTION PORTION | NUMBER OF PROCESSES IN DATA PORTION | |
|---|---|---|---|
| "abc" | 1 | 0 | 44 ... |

PROCESSING POSITION

FIG.19

SYSTEM LIBRARY ENTRANCE DATA TABLE

| SEQUENCE OF SYMBOL CHARACTERS | |
|---|---|
| "abc" | 10002000 |
| | ENTRANCE ADDRESS |

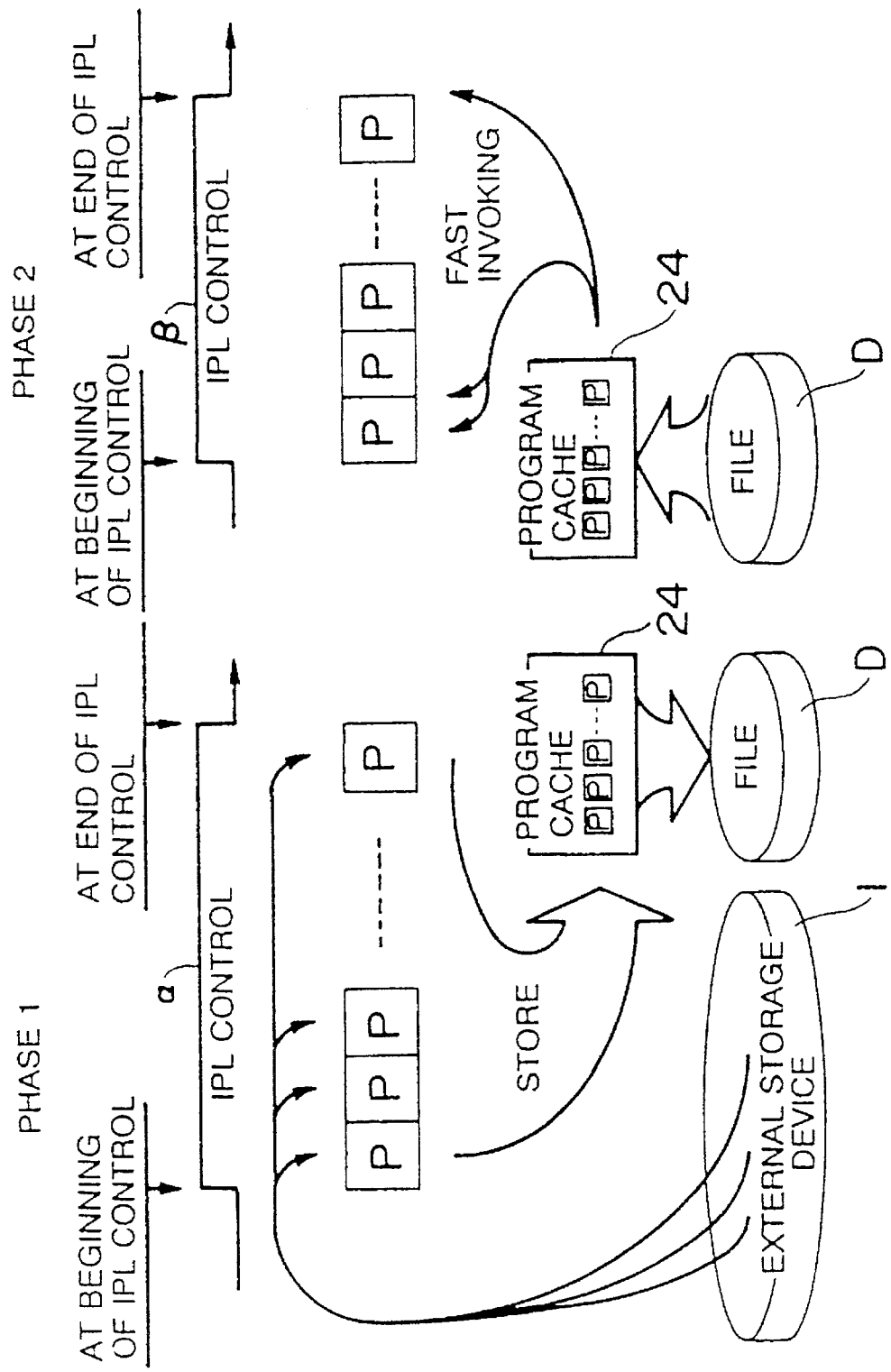

PROGRAM CACHE APPARATUS WHICH ASSOCIATES THE PHYSICAL ADDRESS OF A PHYSICAL PAGE WITH BOTH THE LOGICAL ADDRESS IN A PROGRAM CACHE SPACE AND THE LOGICAL ADDRESS IN A PROCESS SPACE

BACKGROUND OF THE INVENTION

1. Field of the Invention

The present invention relates generally to a program cache apparatus, and, more particularly, to an apparatus for caching programs in a memory to quickly invoke a program in the computer system which executes demand paging type storage management.

2. Description of the Related Art

Recently, a large-capacity memory can be connected as a main storage device to relatively small computer systems because the prices of semiconductor memories gradually become cheaper. Therefore, it is demanded that operating systems (hereinafter called "OS's") which control such computers have a function to effectively use a large-capacity memory. That is, there is a demand for the function which efficiently caches a program or data on an external storage device like a hard disk onto such a large-capacity main memory. Here "cache" means to read data or a program stored in a slow memory, though having large capacity, such as a hard disk, to be executed by a central processing unit, and to hold it in a fast main memory for quick execution of this program next time.

As computer systems become more complex, it is demanded that programs that run on the systems are efficiently developed and maintained. Accordingly, programs are often divided into small modules and stored in an external storage device in the module form. In this case, at the time a program is execute, those many modules are relocated or combined on the main memory and are then run by a central processing unit. In this aspect, therefore, there is also a demand for efficient caching of programs on the main memory.

To meet those demands, many cache systems have been proposed conventionally.

There is an OS which employs a demand paging system, for example, as one of those cache systems. In such an OS, a memory is managed page frame by page frame which is a minute divided memory area (physical page) of a fixed length. A program is also divided into pages of the same size. In such an OS, part of pages which are necessary for a process that is performed in the central processing unit are selected and cached page by page on the memory among pages that constitute a program stored on an external storage device.

More specifically, when invoking of a program is requested by a process ("process" here is a process in a multitask, i.e., a task or an execution unit, and is hereinafter used as such), the correlation between the storage status in the logical space that is secured on the memory for that process and the storage locations of pages constituting this program on an external storage device is checked page by page. Simply invoking a program does not load the pages of the program into page frames on the memory. If the physical page for a page exists in the page cache in the memory (i.e., if this page has already been loaded from the external storage device) when this page is actually accessed, this physical page is mapped in the logical space of that process (i.e., an address translation table is set to translate the designation of the logical address from the process to the designation of a physical address, so that the physical address from the process is accessible from the process). If the physical page for the page in question is not present in the page cache, a new physical page is secured, the contents of that page from the external storage device are written on the new physical page to locate the physical page in the page cache. At the same time, the physical page is mapped in the logical space of the process.

The physical page on the page cache and the physical page allocated to the process are shared by a copy-on-write means. The copy-on-write means is accomplished in the following manner. While reading from the physical page by the process is permitted (reading is possible without copying), writing is disabled. When a request to write on the physical page is made by the process, an interruption occurs. In the interrupt process, the contents of the physical page are copied on a new and different page, this new page is allocated to the process this time and writing is enable. According to this copy-on-write, even if the contents of the physical page allocated to the process are altered, the contents of the original physical page can be left unchanged to be ready for an access from another process.

When a program is loaded, an OS should relocate the program and link the program to the system library before a process actually executes that program (i.e., the instruction portion and data portion of the program). According to the conventional demand paging system,. those relocation and linkage are executed in the process space after the setting for the copy-on-write is completed.

The detail of the program relocation will now be discussed. Programs stored in an external storage device are designed on the premise that they are mapped in the logical space that has a specific range of addresses (logical addresses). For instance, in the example shown in FIG. 11, it is assumed that a program stored in an external storage device is mapped in the logical space starting at the address 1000. Therefore, a jump subroutine instruction in the instruction portion of the program is set to jump to the address 1300 which is considered within that program range. When an OS loads this program as predicted as shown in FIG. 11, relocation need not be executed. On the premise that a process loads a plurality of programs, however, there is no guarantee that a program is loaded at the predicted address. When a program is loaded at an address other than the predicted one as shown in FIG. 12, therefore, if the jumping address in the jump subroutine instruction is left unchanged, a jump is made to the address 1300 which is not associative to this program at all. To avoid this problem, the OS refers to the relocation table as shown in FIG. 14 and rewrites the jumping address to the correct address within the program range as shown in FIG. 13.

The linkage to the system library will now be described. Programs stored in an external storage device may be designed on the assumption that they refer to subroutines in the system library stored in the external storage device. In the example shown in FIG. 15, for instance, a jump subroutine instruction is set at the address 1044 of the loaded program. In the initial state, however, a dummy address "00000000" is written at the jumping address in this jump subroutine instruction, as shown in FIG. 15. Before executing the program in the process space, the OS refers to the linkage table (FIG. 18) in the program and writes the head address of some subroutine in the system library (FIG. 17) at the jumping address, as shown in FIG. 16.

If the contents of a page are not rewritten by the execution of a program, i.e., if the process merely reads the contents of a program, simply mapping the physical page mapped on the page cache onto the process space allows this physical page to be shared by the page cache and the process space. However, the execution of a program actually rewrites the page. In particular, since the data area of the program is written by the execution of the program, the physical page is also rewritten. When the program is executed next time, therefore, malfunction occurs.

On the assumption that the contents of a page are rewritten, the contents of a program loaded onto the physical page may be copied on another physical page, which is then mapped in the process space. In this case, however, two pages with the same contents that will not be rewritten would exist redundantly, thus reducing the efficiency usage of memory.

According to the conventional demand paging system, therefore, when a program loaded onto a physical page from an external storage device is mapped in the process space, only the copy-on-write setting is carried out.

But, the relocation of a program and linkage of the program to the system library, which will be executed subsequently, inevitably include writing processes. The writing processes generate an interrupt, so that the physical page where this program is loaded is inevitably copied. The physical page should thus always be doubled, lowering the efficiency of memory usage.

According to the conventional demand paging system, the relocation of a program and linkage of the program to the system library are executed in the process space. When the same program is invoked again, therefore, the physical page where this program is loaded is mapped in the process space by the setting of the copy-on-write. It is thus necessary to execute similar program relocation and program linkage to the system library again, resulting in a poor processing efficiency. Further, since relocation information and linkage information on the external storage device are referred to in the program relocation and linkage to the system library at the time the program is invoked again, I/O processing is required, considerably increasing the processing time.

SUMMARY OF THE INVENTION

It is therefore an object of the present invention to minimize the double usage of memory caused by the copying of a physical page through the execution of copy-on-write, thus improving the efficiency of memory usage.

To achieve the above object, a program cache apparatus according to this invention comprises a first storage device for storing programs; a second storage device having a plurality of physical pages given with respective physical addresses and a memory logical space as a set of logical addresses corresponding to the physical addresses, the memory logical space including a program cache space for storing a program read from the first storage device and a process space for storing a program to be executed by a processing unit; the processing unit for loading a program from the first storage device on the physical pages and accessing the program on the physical pages to execute a specific process; address-data changing element for altering data about addresses in the program stored in the second storage device; management element for associating the physical addresses with the logical addresses in such a manner that after the address-data changing element alters the address data, the management element associates the physical address of the physical page corresponding to a program stored in the program cache space with a logical address in the process space; and copy element for copying the program stored on the physical page onto another physical page when writing to the program is effected after the physical address is associated with the logical address in the process space by the management element.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 17 is an explanatory diagram showing the system library in the second embodiment;

FIG. 18 is an explanatory diagram showing a linkage table in the second embodiment;

FIG. 19 is an explanatory diagram showing an entrance data table for the system library in the second embodiment;

FIG. 30 is a time chart illustrating the operation of the third embodiment.

DETAILED DESCRIPTION OF THE PREFERRED EMBODIMENTS

Preferred embodiments of the present invention will now be described referring to the accompanying drawings. In the individual embodiments described below, a target to be cached is not a page, a segment of a program, but the program itself. In the following description, "program" means not only a single application program but also a unit program which is a part of such an application program and has at least one instruction.

First Embodiment

Figure 1:
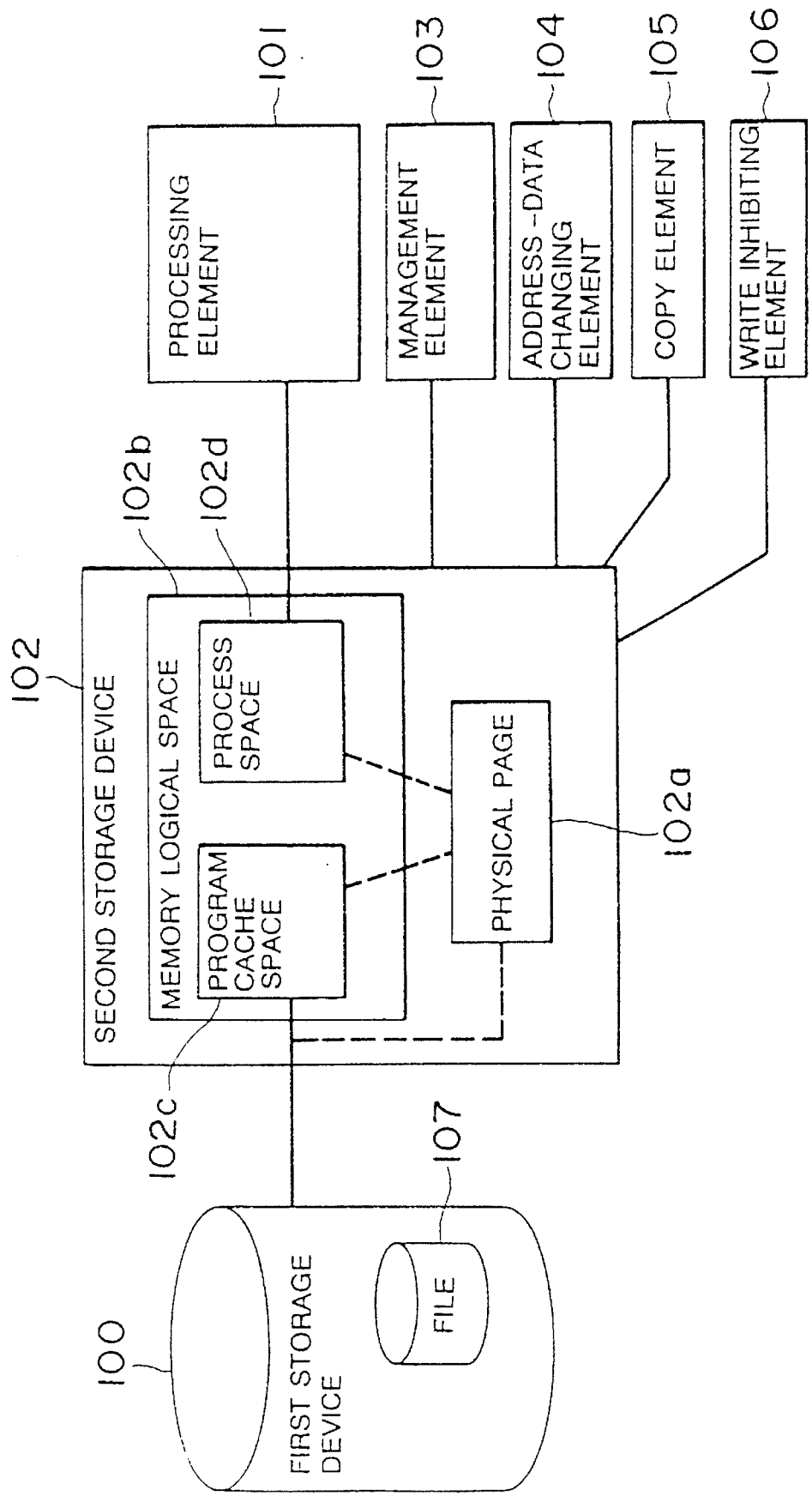
FIG. 1 is a block diagram schematically showing a first embodiment of the present invention.

FIG. 1 presents a diagram showing the hardware structure of a program cache apparatus in a computer system according to a first embodiment of the present invention.

This program cache apparatus comprises a first storage device 100, a second storage device 102 connected to the first storage device 100, a processing element 101, a management element 103, an address-data changing element 104, a copy element 105 and write inhibiting element 106. The elements 101 to 106 are all connected to the second storage device 102.

The first storage device 100 is a storage device for storing programs.

The second storage device 102 is a storage device which has a plurality of physical pages 102a to which respective physical addresses are given. The physical pages 102a are the memory area of the second storage device 102 divided into a plurality of parts. The "physical address" specifies the physical location of each physical page. Logical addresses of a different system from that of the physical addresses are also given to the physical pages 102a. Since the logical addresses are given in such a way that two or more physical pages 102a are not associated with one logical address (two or more logical addresses may be associated with one physical page), one logical space can be grasped from a set of the logical addresses. This logical space is called a memory logical space 102b. This memory logical space 102b is separated into a program cache space 102c for storing a program read from the first storage device 100 and a process space 102d for storing a program the processing element 101 executes.

The processing element 101 has a function to read a program from the first storage device 100 and stores it on the physical page 102a. The processing element 101 also accesses the program stored on the physical page 102a and executes this program to perform a specific process.

The address-data changing element 104 alters data about addresses described in the program stored in the second storage device 102.

The management element 103 associates the physical addresses of the individual physical pages 102a with the logical addresses. After the address-data changing element 104 alters the address data, the management element 103 associates the physical address of the physical page 102a corresponding to the logical address of a program, stored in the program cache space 102c, with a logical address in the process space 102d.

The copy element 105 copies the program stored on one physical page 102a onto another physical page 102a. More specifically, when writing to the program is effected after the physical address is associated with the logical address in the process space 102d by the management element 103, the copy element 105 copies the contents of the physical page 102a or that is the contents of the program onto another physical page.

The first storage device 100 can be a non-volatile memory, while the second storage device 102 can be a volatile memory. For instance, the first storage device 100 may be a magnetic storage device, such as a hard disk, a magneto-optical disk or a floppy disk, or a flash memory. It is desirable that the first storage device 100 have a large capacity. The first storage device 100 may be connected externally to a computer in which this program cache apparatus is installed, or may be incorporated inside such a computer. Alternatively, the first storage device 100 may be a storage device connected to another computer via a line. The second storage device 102 may be a semiconductor memory like a RAM (Random Access Memory). It is desirable that the second storage device 102 is a fast writable and readable storage device.

It is desirable that the first storage device 100, the second storage device 102 and the processing element 101 is mutually connected via a bus.

The processing element 101 may be designed so that it has a plurality of execution units and executes a program for each execution unit. The execution units may be such that processes are executed in a time-divisional manner or are executed in parallel.

The function of the management element 103 may be accomplished by the processing element 101 or by a program in another processing element 101. The management element 103 may also be firmware or hardware such as a logic circuit that has an address translation table.

The data about the address in a program which is to be altered by the address-data changing element 104 may be an instruction to jump a process to the head address of a subroutine included in this program or a subroutine present outside this program, or may be address data that indicates the storage location of data to be referred to. The address-data changing element 104 may be designed in such a way as to refer to a table which is included in a program and is read together with this program from the first storage device 100, thereby referring to the contents of the program.

The process space 102d on the memory logical space 102b may be prepared for each process unit. In this case, a plurality of process spaces 102d may be present in accordance with the execution of each process unit or may be produced or erased in a time-divisional manner.

After the management element 103 associates the physical page 102a with the logical address in the process space 102d, the write inhibiting element 106 may inhibit writing to the program stored on this physical page 102a.

After the copy element 105 copies the physical page 102a on another physical page 102a, the original physical page 102a may be associated only with the program cache space 102c and the copy-destination physical page 102a may be associated only with the process space 102d.

The first storage device 100 may have a file 107 for collectively storing all the programs stored in the program cache space 102c. Further, the processing element 101 may be designed to successively execute a plurality of predetermined programs within a given period of time. In this case, it is desirable that all the programs stored in the program cache space 102c be stored in the file 107 when the given period elapses. It is further desirable that all the programs stored in this file 107 be restored in the program cache space 102c when the processing element 101 request the programs.

The operation of the thus constituted first embodiment of this invention will now be described.

First, when the processing element 101 requests a program, the second storage device 102 loads the program stored in the first storage device 100 onto the physical page 102a. In the memory logical space 102b, the physical address of the physical page 102a where this program is stored is associated with the logical address in the program cache space 102c by the management element 103. It is therefore possible to treat the program as stored in the program cache space 102c.

Next, the address-data changing element 104 alters information on the addresses in the program, in the program cache space 102c.

Then, the management element 103 associates the physical address of the physical page 102a where the program, which is treated as stored in the program cache space 102c, is physically described, with the logical address in the process space 102d. At this time, therefore, the physical page 102a holding the program is shared by the program cache space 102c and the process space 102d, and the program is stored in the process space 102d. Thereafter, the processing element 101 can access the program in the process space 102d without copying the physical page 102a.

When the processing element 101 executes writing on the program in the process space 102d, the copy element 105 copies the physical page 102a. In the above manner, so-called copy-on-write is executed.

According to this embodiment, as described above, the physical page 102a where a program is described is not copied unless the processing element 101 performs writing on the program. This minimizes the double usage of memory, thus improving the memory use efficiency. Further, if the file 107 for saving and restoring a program is provided, single reading from the storage device 100 is sufficient even in process space where many programs are invoked. This can significantly shorten the time required for a process.

Second Embodiment

Figure 2:
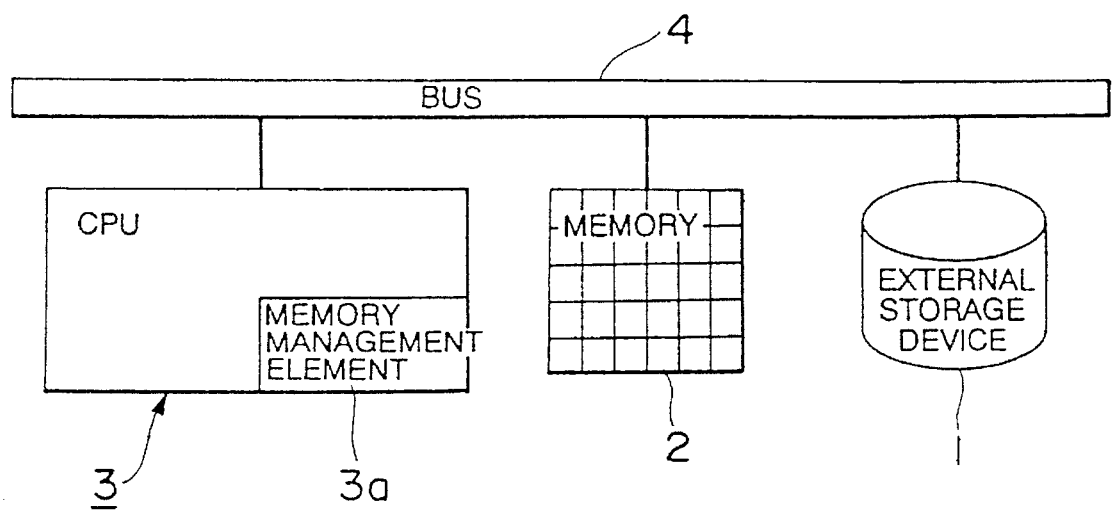
FIG. 2 is a block diagram of a program cache apparatus according to a second embodiment of this invention.

FIG. 2 illustrates the hardware structure of a program cache apparatus in a computer system according to a second embodiment of this invention.

In FIG. 2, an external storage device 1, a memory 2 and a central processing unit (CPU) 3 are mutually connected by a bus 4.

Running an OS stored in the external storage device and cached in the memory 2, the CPU 3 controls the statuses and operations of the external storage device 1, the memory 2 and the CPU 3 itself. The CPU 3 invokes an application program, stored in the external storage device 1 and cached in the memory 2, and executes a predetermined task (process) under the control of the OS. This CPU 3 can perform multitasking which virtually executes a plurality of tasks in parallel at a time.

A part of the function of the CPU 3 is equipped with the function of a memory management element 3a. That is, this memory management element 3a has a function to translate the logical address on the memory 2, which a process designates to read or write programs or data, to the physical address of a physical page 48 where these programs or data are physically stored. This address translation has only to use an address translation table as disclosed in, for example, Japanese Unexamined Patent Publication No. 205535/1992.

Figure 3:
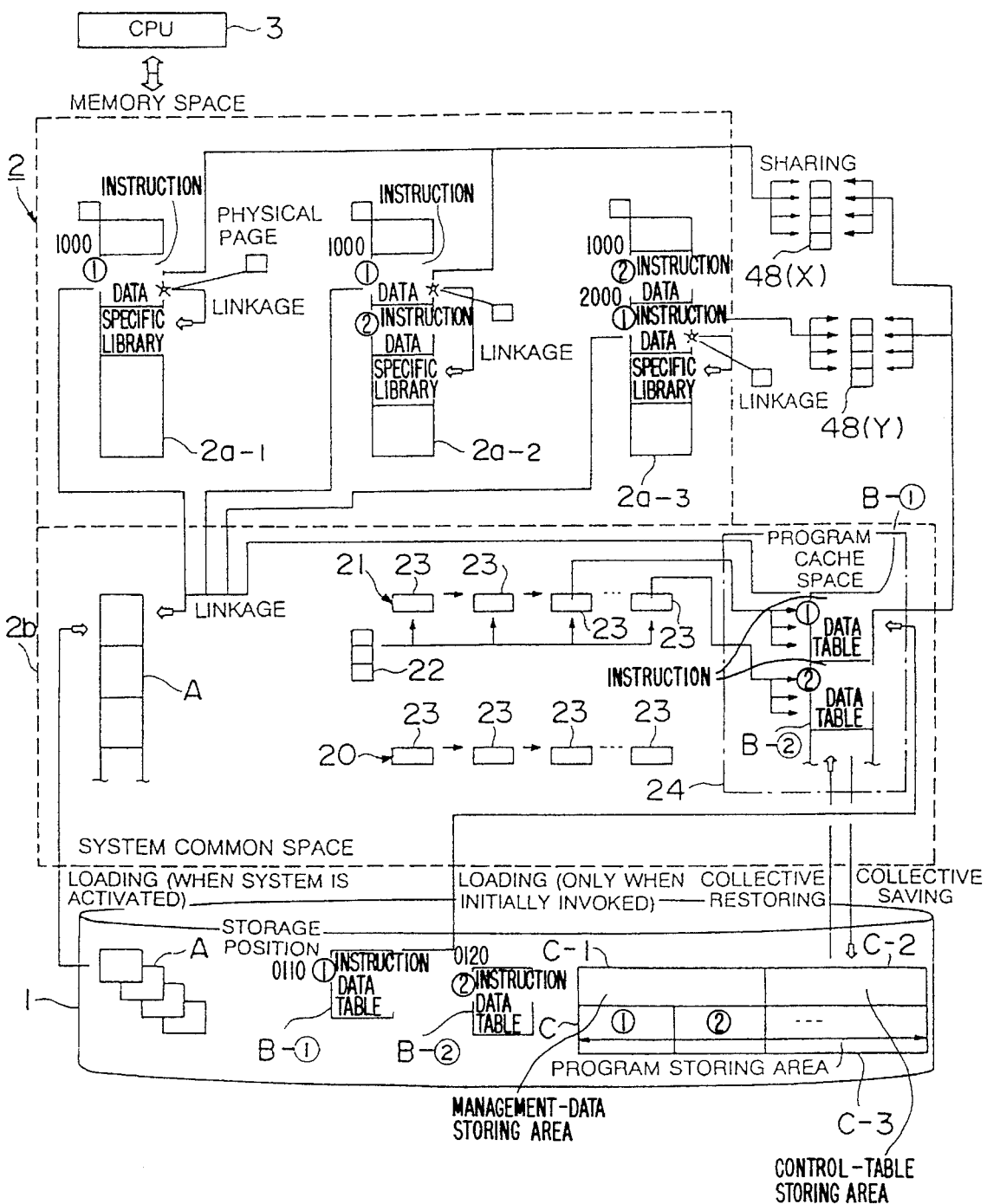
FIG. 3 is a detailed diagram of the memory space of a memory 2 in FIG. 2.

FIG. 3 presents the detailed illustration of the structures of the external storage device 1 and memory 2 in FIG. 2. As apparent from FIG. 3, the external storage device 1 stores a system library A, a plurality of programs B and save/restore file C.

The system library A is constituted as a set of many subroutines A' as shown in FIG. 17. When the system is activated, the subroutines of the system library A are collectively loaded into a system common space 2b of the memory 2 and stay resident until the system is powered off. The system library A is added with a "system library entrance data table" shown in FIG. 19. Based on a sequence of symbol characters specified by a "program B linkage table" shown in FIG. 18, this "entrance data table" provides the entrance address of an associated subroutine A' in the system library A.

Each program B consists of a command, data and tables (i.e., the linkage table and relocation table). FIG. 3 exemplifies the situation in which two programs B are stored in the external storage device 1. Of those programs B, the first program B-① is stored at the address 0110 (physical address) in the external storage device 1, and is expected to be linked to the system library A. The second program B-① is stored at the address 0120 (physical address) in the external storage device 1, but is not expected to be linked to the system library A. Each program B is read from the external storage device 1 and written in a program cache space 24 of the memory 2 only the first time the program is invoked. The save/restore file C stores (part of) information which has collectively saved in the system common space 2b of the memory 2 at the time the computer system is deactivated. When the system is activated again, the information stored in this save/restore file C is collectively restored in the system common space 2b. This save/restore file C consists of a management-data storing area C-1, a control-table storing area C-2 and a program storing area C-3. The control-table storing area C-2 directly stores the contents of a "control table in-use list 21" which is written in the system common space 2b. The program storing area C-3 directly stores the program written in the program cache space 24 in the system common space 2b. The management-data storing area C-1 stores information (the number of programs, etc.) necessary to collectively restore the contents of the save/restore file C in the system common space 2b.

The memory 2 has a memory space (logical space) which can be recognized by a logical address. This memory space (logical space) is virtual, and a logical address in the memory space is actually translated to the physical address of the physical page 48 according to the translation table. In other words, information located at any logical address in the memory space is actually stored on some physical page in the memory. This memory space includes a plurality of process spaces 2a and one system common space 2b.

This system common space 2b has the program cache space 24. A plurality of programs B read from the external storage device 1 are stored in this program cache space 24. The relocation of a program, the linkage of a program to the system library and setting for copy-on-write are executed in this program cache space 24. In FIG. 3, a group of physical pages corresponding to the logical addresses in the program cache space 24 are shows outside the memory space. This is because that the physical space that is grasped by a physical address and a memory space that is grasped by a logical address are of the same substance but exist (are grasped) on different dimensions, making it difficult to express those spaces by the same dimension. Arrows in FIG. 3 indicate the association of the logical addresses with the physical addresses. This association is controlled by the aforementioned memory management element 3a.

Stored in the other part than the program cache space 24 in the system common space 2b are the system library A, the control table in-use list 21, an available control table list 20 and a hash table 22.

The control table in-use list 21 and the available control table list 20 each have the structure in which a plurality of control tables 23 for respectively managing the individual programs B are mutually linked. The control table in-use list 22 is a list of linked control tables 23 each describing the management data of each program B stored in the program cache space 24. Therefore, data "0110" indicating the storage location of the first program B-① as its identification (hereinafter referred to as "ID") data is described in any one of the control tables 23 which constitute the control table in-use list 21. The hash table 22 serves to find, based on this ID data, an associated control table 23 fast. The available control table list 20 is a list of linked, extra control tables 23 whose associated programs B are not stored in the program cache space 24.

The process space 2a is prepared for each process. Thus, a plurality of process spaces 2a exist in the memory space. Stored in each process space 2a is a program that can be read and written by an access from the associated process. The program mentioned here is also a program whose storage location is indicated by the logical address and corresponds to a program physically stored on the physical page in the memory 2. To explain this correlation, the process spaces 2a are illustrated in parallel to one another in FIG. 3.

With regard to the star-marked portion in each process space 2a, it is linked to the library specific to the process and thus becomes another physical page as copying by copy-on-write is executed.

A group of physical pages X or Y are allocated to the instruction and data areas in each process space 2a as indicated by arrows in FIG. 3. More specifically, FIG. 3 illustrates an example where first, a process a invokes the program B-① stored in the external storage device 1 to be located at the address 1000 (2a-1), then a process b invokes the program B-① to be located also at the address 1000 (2a-2) and finally a process c invokes the program B-① to be located at the address 2000 (2a-3). The physical pages 48 (X) in which the contents of the program ① are written via the program cache space 24 at the time the process a has invoked the program ① are shared by the process b due to the same address when this process b invokes the program ① (at this point of time, the physical pages 48 (X) are shared also by the program cache space 24). When the process c invokes the program ① however, relocation is performed in the program cache space 24. At this point of the relocation, copy-on-write is executed to copy the contents of the physical pages 48 (X) into physical pages 48 (Y). Then, the physical pages 48 (X) are deallocated from the program cache space 24 and the physical pages 48 (Y) are mapped into the space 24. As a result, the physical pages 48 (Y) are shared by the program cache space 24 and the process c. Although the same control is performed for the program B-② the illustration of the sharing of the physical pages is omitted in FIG. 3.

The command and data areas in the process space 2a are linked to the system library A in the system common space 2b as a result of the linkage process performed in the program cache space 24.

Figure 4:
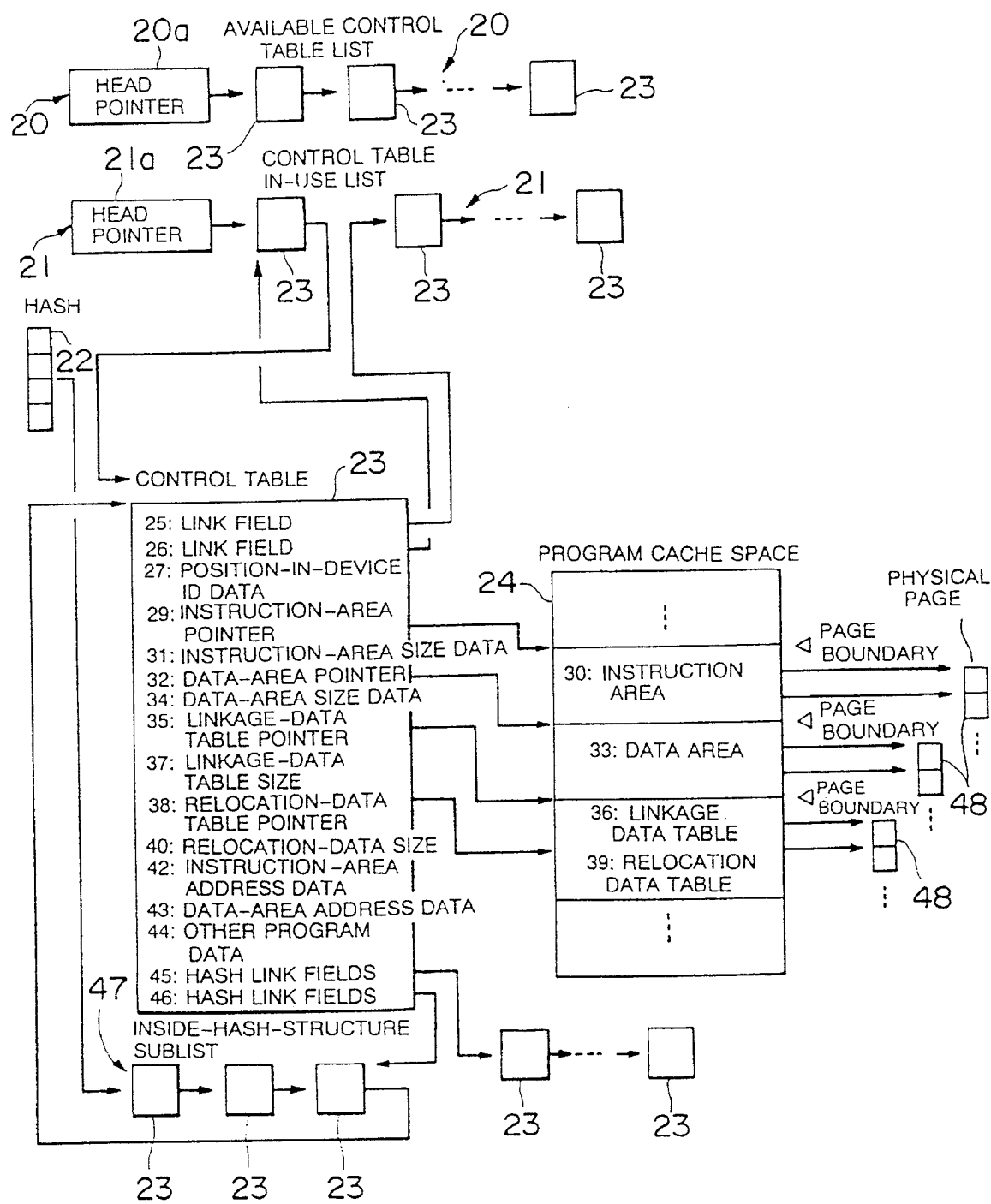
FIG. 4 is a detailed diagram of a system sharing space 2b in FIG. 3.

The relation among the individual tables 20 and 21 in the system common space 2b of the memory space in FIG. 3 and the program cache space 24 will be described in more detail with reference to FIG. 4.

A plurality of programs are stored in the program cache space 24. FIG. 4, however, shows only one program for the sake of descriptive convenience. Each program has an instruction area 30, a data area 33, a coupling data table 36 and a relocation data table 39.

The instruction area 30 contains an instruction to be executed by the program. The data area 33 contains data that is used when the instruction is executed.

The linkage data table 36 describes information that is used when linkage is executed as shown in FIG. 18. In FIG. 18, a sequence of symbol characters of a subroutine to be referred to is described first in each entry in the linkage data table, followed by the numbers of processes in the instruction portion and the data portion that rewrite the jumping address for referring to this subroutine, and information as to on which byte from the head bit of the instruction portion (or data portion) the address to be rewritten is located is described at the end of the entry.

Figure 14:
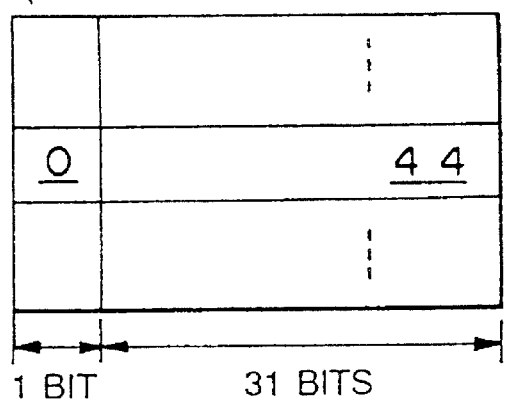
FIG. 14 is an explanatory diagram showing a relocation table (for the instruction portion) in the second embodiment.
Figure 15:
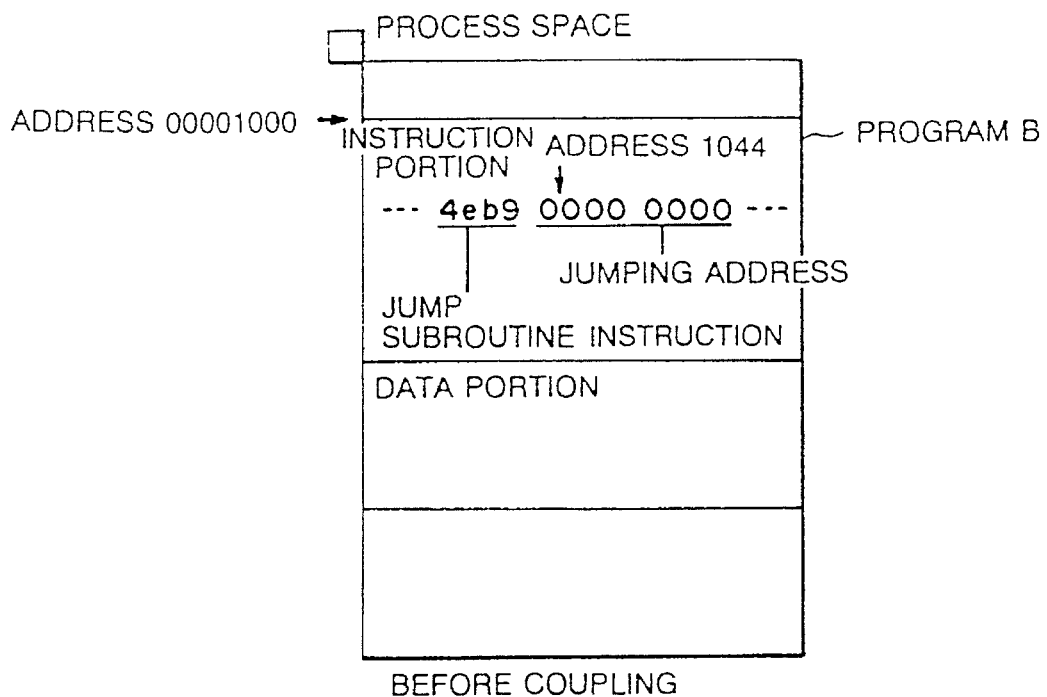
FIG. 15 is an explanatory diagram showing a process space before linkage to the system library in the second embodiment.
Figure 16:
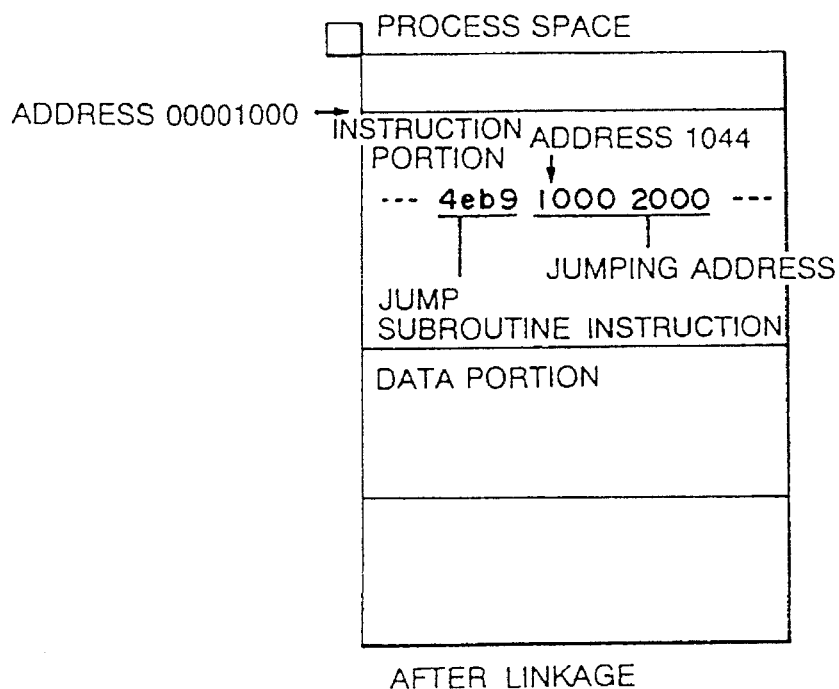
FIG. 16 is an explanatory diagram showing a process space after linkage to the system library in the second embodiment.

As shown in FIG. 14, the relocation data table 39 describes the addresses to be relocated which are used at the time relocation is performed. In FIG. 14, the first one bit indicates whether the value to be rewritten is in the instruction portion "0" or in the data portion "1" and the following 31 bits indicate on which byte from the head bit of the instruction portion (or data portion) the location to be rewritten is. The rewriting range is specified to be, for example, 4 bytes by the OS. In the example illustrated in FIGS. 11 to 14, the relocation target is a jump subroutine described in the instruction portion. As a variation, the relocation target may be the description in the instruction portion which represents an address in the data portion, the description in the data portion which represents an address in the instruction portion, or the description in the data portion which represents an address in the data portion. The relocation data table 39 is separated into two, one for the data portion and the other for the data portion.

Various types of information described in those areas 30, 33, 36 and 39 are physically described on the physical page 48 affixed with the physical address that is translated by the memory management element 3a, as already described.

Each program B stored in the program cache space 24 is provided with the control table 23 that describes management data of that program B. Of various types of management data described in the control table 23, link fields 25 and 26 are data used to constitute the control table list 21. Position-in-device ID data 27 indicates the storage position (physical address) in the external storage device 1 of the program corresponding to the control table 23. An instruction-area pointer 29 indicates the head address (logical address) of the instruction area 30 of the program in the program cache space 24. An instruction-area size data 31 represents the size of the instruction area 30. A data-area pointer 32 likewise indicates the head address (logical address) of the data area 33. Data-area size data 34 represents the size of the data area 33. A linkage-data table pointer 35 likewise indicates the head address (logical address) of the linkage data table 36. A linkage-data table size 37 represents the size of the linkage data table 36. A relocation-data table pointer 38 likewise indicates the head address (logical address) of the relocation data table 39. A relocation-data size 40 represents the size of the relocation data table 39. Instruction-area address data 42 represents positional data indicating at which logical address the instruction area 30 is expected to be located when the program corresponding to the control table 23 is mapped in the process space 2a. Data-area address data 43 represents positional data indicating at which logical address the data area 33 is expected to be located when the program corresponding to the control table 23 is mapped in the process space 2a. Other program data 44 indicates other management data. Hash link fields 45 and 46 are data used to construct an inside-hash-structure sublist 47.

The control table in-use list 21 has a list structure in which control tables 23 describing the management data of the programs currently stored in the program cache space 24 are mutually linked together by the link fields 25 and 26. The link field 25 indicates the head address of the control table 23 that describes the management data of a program invoked immediately before the invoking of the program corresponding to this control table 23. The link field 26 likewise indicates the head address of the control table 23 that describes the management data of a program invoked immediately after the invoking of the program corresponding to this control table 23. Described in a head pointer 21a of the control table in-use list 21 is the address of the head control table 23 that constitutes the list 21.

The hash table 22 is used to quickly check whether or not the control table 23 corresponding to a program whose invoking has been requested by the process is present in the control table in-use list 21. The individual fields in this hash table 22 store all the head addresses of the control tables 23 in a plurality of inside-hash-structure sublists 47.

This inside-hash-structure sublist 47 has a list structure in which currently-used control tables 23 are mutually linked by hash link fields 45 and 46 in an order different from the order in the control table in-use list 21. Therefore, the control table in-use list 21 and the inside-hash-structure sublists 47 are constituted by commonly using the same control tables 23. The functions of the hash link fields 45 and 46 are the same as those of the link fields 25 and 26.

The hash table 22 uses a numeral to specifically identify the storage position of a program in the external storage device 1 (i.e., address) as a retrieval key to check if the control table 23 corresponding to that program is present in the control table in-use list 21. This numeral is the same as the numeral of the position-in-device ID data 27 in the control table 23.

The available control table list 20 has a list structure where those of the entire control tables 23 which are not listed in the control table in-use list 21 are mutually linked. That is, in the available control table list 20, the control tables 23 which do not describe the management data of any of the programs stored in the program cache space 24 are linked by the link fields 25 and 26. Described in a head pointer 20a of the available control table list 20 is the address of the head control table 23 in the list 20.

The detail of caching executed by the CPU 3 under the control of the OS will be described below with reference to the flowchart in FIG. 5.

This flow starts when a process request the invoking of a program. In the first step S01, invoking request ID data such as a program name is converted to the positional ID data (address) 27 in the external storage device 1.

In the next step S02, the hash table 22 is searched based on the positional ID data obtained in step S01 to check if the requested program is present in the program cache space 24 (i.e., if the corresponding control table 23 is present).

If it is determined through the searching of the hash table 22 that the program in question is not located in the program cache space 24, the control table 23 is acquired in step S03.

Figure 6:
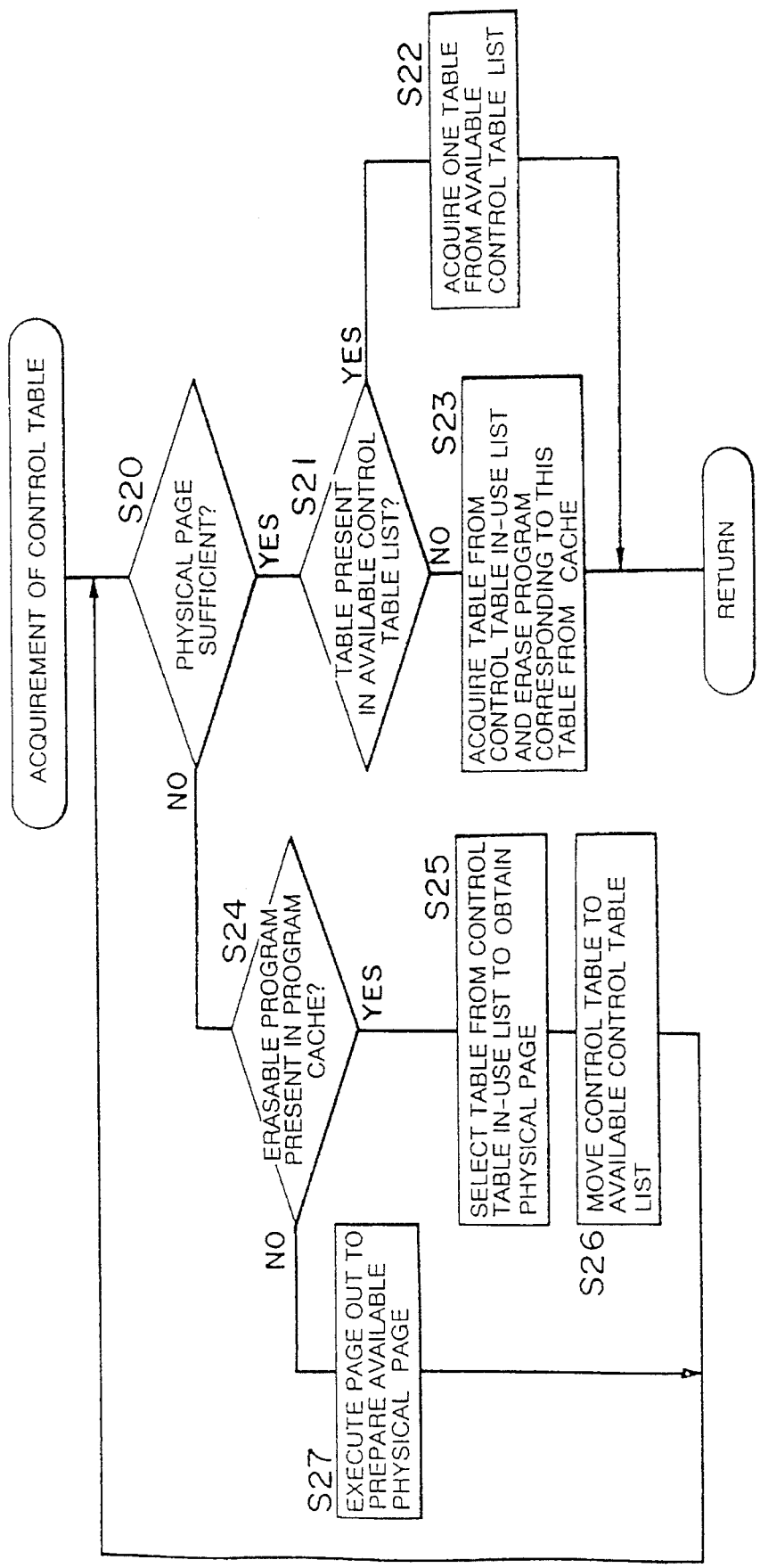
FIG. 6 is a flowchart illustrating the subroutine of a process for acquiring a control table, which is executed in step S03 in FIG. 5.

FIG. 6 presents the flowchart which illustrates the detail of the subroutine executed in this step S03. In this subroutine, it is first checked if the number of currently available physical pages 48 is sufficient for storing the invoking-requested program (step S20). If the quantity is sufficient, it is then checked if the available control table list 20 contains the control tables 23 (step S21). When there is any control table 23 in the available control table list 20, one control table 23 is acquired from this list 20 (step S22). Then, the flow leaves this subroutine.

If it is determined in step S21 that no control tables 23 are present in the available control table list 20, the control table 23 linked to the end of the control table in-use list 21 is selected and acquired. Then, the program corresponding to this selected control table 23 is erased from the program cache space 24 (step S23). That is, the association with the physical page 48 is disabled to free the physical page 48. Then, the flow leaves this subroutine.

When it is determined in step S20 that the number of physical pages 48 is insufficient, it is checked if there is any erasable program in the program cache space 24 (step S24). When there is any erasable program, one control table 23 linked to the end of the control table in-use list 21 is selected as in the case where there are no available control tables 23. Then, the management data in the selected control table 23 is erased to free the physical pages 48 (step S25). After the data is erased, the selected control table 23 is moved to the available control table list 20 (step S26). If it is determined in step S24 that no erasable programs are present in the program cache space 24, page out is executed to provide an available physical page 48 (step S27). The page out is a process for returning the physical page, which is stored in the memory 2 but is not relatively used, to the external storage device 1 regardless of its storage position in the logical space, thereby providing an available physical pages 48.

After the processing in step S26 or step S27 is completed, the flow returns to step S20. Even if one control table 23 is erased or page out is executed, therefore, a sequence of processes in those steps S24 to S27 is repeated when the available physical pages are still insufficient.

Returning to FIG. 5, in the subsequent step S04, a new (available) physical page 48 is allocated to the program cache space 24.

In the next step S05, the program (including the command portion, data portion and tables) which has been requested to be invoked by the process is loaded from the external storage device 1 and is stored on the physical page 48 that is allocated to the program cache space 24 in step S04.

Next, the hash link fields 45 and 46 in the acquired control table 23 are set to the proper values so that this control table 23 is affixed to the inside-hash-structure sublist 47. By setting the link fields 25 and 26 in this control table 23 to the proper values, this control table 23 is also affixed to the head of the control table in-use list 21. Further, all the remaining management data in the control table 23 are set in accordance with the contents of the program loaded in step S05.

Then, it is checked in step S07 if the relocation of the program is necessary. This check is accomplished by determining if the address requested by the process as an address to locate this program matches with the address described in the instruction-area address data 42 and the address described in the data-area address data 43. In other words, if the requested address does not match with the address described in the instruction-area address data 42 and the address described in the data-area address data 43, relocation is necessary. In this case, therefore, relocation is executed in the program cache space 24 in the subsequent step S08. When relocation is executed, the address described in the instruction-area address data 42 and the address described in the data-area address data 43 are altered to match the relocation address to be ready for the case where the same program is invoked next time. If it is determined in step S07 that no relocation of the program is necessary, the relocation process in step S08 is skipped. In any case, the flow then advances to step S09.

In the step S09, the linkage data table 36 is referred to check if linkage with the system library A is necessary. If the linkage process is necessary, the linkage with the system library A is executed in the program cache space 24 in the next step S10. When it is determined in step S09 that the linkage process is unnecessary, the linkage process in step S10 is skipped. In any case, the flow then advances to step S15.

If it is determined through the searching of the hash table 22 in step S02 that the program in question is located in the program cache space 24, the location of the control table 23 corresponding to this program in the control table in-use list 21 is changed to the head position from the current position in step S11.

Then, the physical pages 48 where the program corresponding to this control table 23 (i.e., present in the program cache space 24) is physically stored are remapped in the program cache space 24 by means of copy-on-write in step S12. In some case, however, the association of those physical pages 48 with another process space 2a, which has been established at the time of the previous invoking of the program, may remain unreleased yet. Actually, therefore, the physical pages 48 are set referable and not writable and setting for copy-on-write is to be simply performed. No program loading from the external storage device 1 is thus performed. In this case, if the remapped physical pages 48 are currently used by another process, this another process and the program cache space 24 share the physical pages 48. If the remapped physical pages 48 are not currently used by another process, the physical pages 48 are not shared by the process space 2a and the program cache space 24.

Then, it is checked in step S13 if the relocation of the program is necessary. This check is accomplished by determining if the address requested by the process as an address to locate this program matches with the address described in the instruction-area address data 42 and the address described in the data-area address data 43. In other words, if the address requested by the process does not match with the address described in the instruction-area address data 42 and the address described in the data-area address data 43, relocation is necessary. In this case, therefore, relocation is executed in the program cache space 24 in the subsequent step S14. When relocation is executed, the address described in the instruction-area address data 42 and the address described in the data-area address data 43 are altered to match the relocation address. If it is determined in step S13 that no relocation of the program is necessary, the relocation process in step S14 is skipped. In any case, the flow then advances to step S15.

In step S15, the physical pages 48 where the program present in the program cache space 24 is physically stored are remapped in the process space 2a by setting for copy-on-write. If the physical pages 48 are already shared (without copying) by the program cache space 24 and a process space 2a for another process as a result of the process in step S12, the process in this step S15 allows the same physical pages 48 to be shared by the two process spaces 2a and the program cache space 24.

It is then checked in step S16 whether or not linkage with the library specific to the process in question is necessary. When this linkage process is necessary, the linkage process is performed in the process space in step S17. If this linkage process is unnecessary, the linkage process in step S17 is skipped.

Next, the physical pages 48 remapped by setting for copy-on-write are removed from the program cache space 24 in step S18. In this process, reference to the physical pages 48 from the program cache space 24 is simply disabled. Therefore, the association of the program cache space 24 with the physical pages 48 is not reset.

In the next step S19, control is given to the process that has requested the program to be invoked. Then, the flow in FIG. 5 is terminated.

Figure 5:
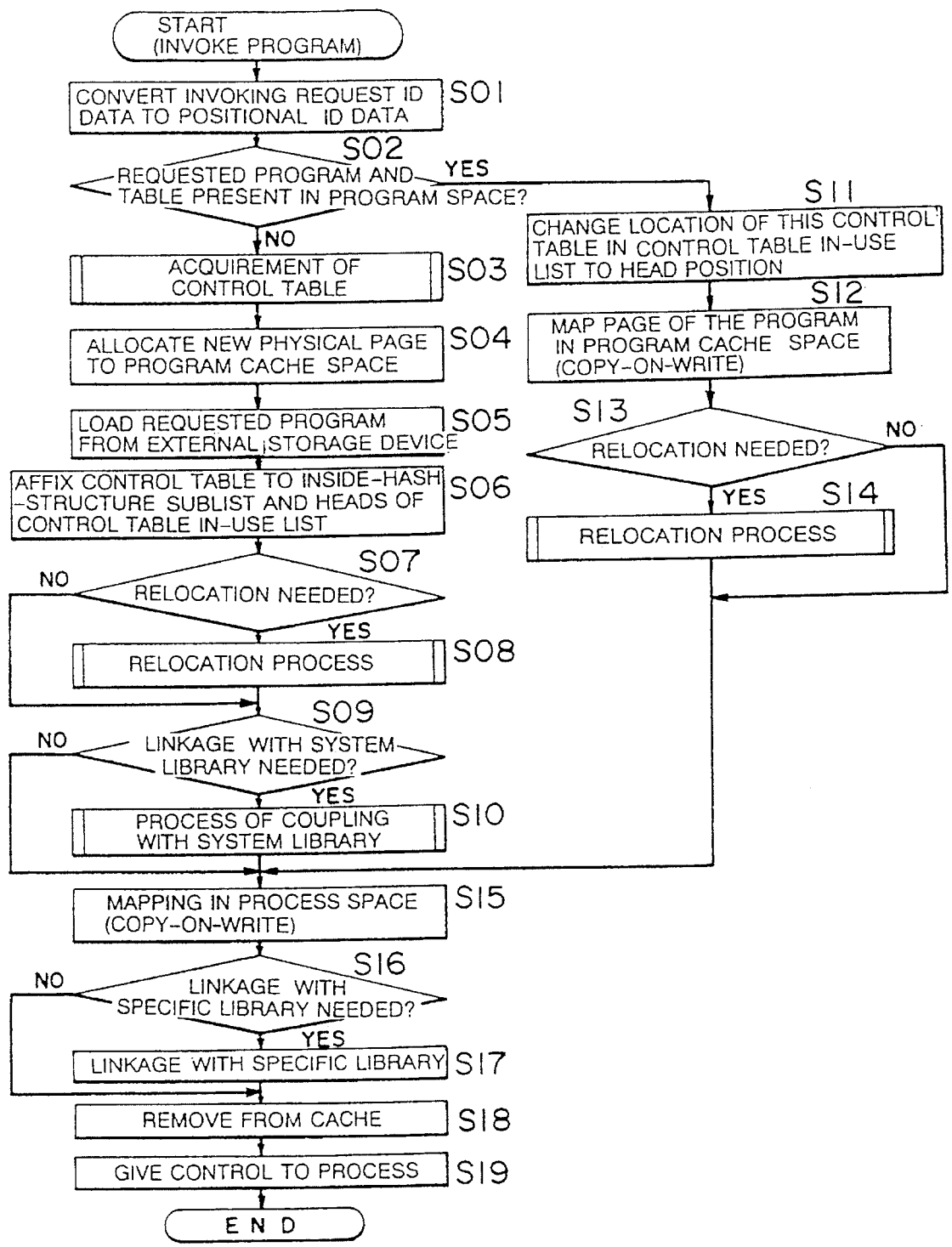
FIG. 5 is a flowchart illustrating a cache control that is executed by the program cache apparatus according to the second embodiment of this invention.
Figure 7:
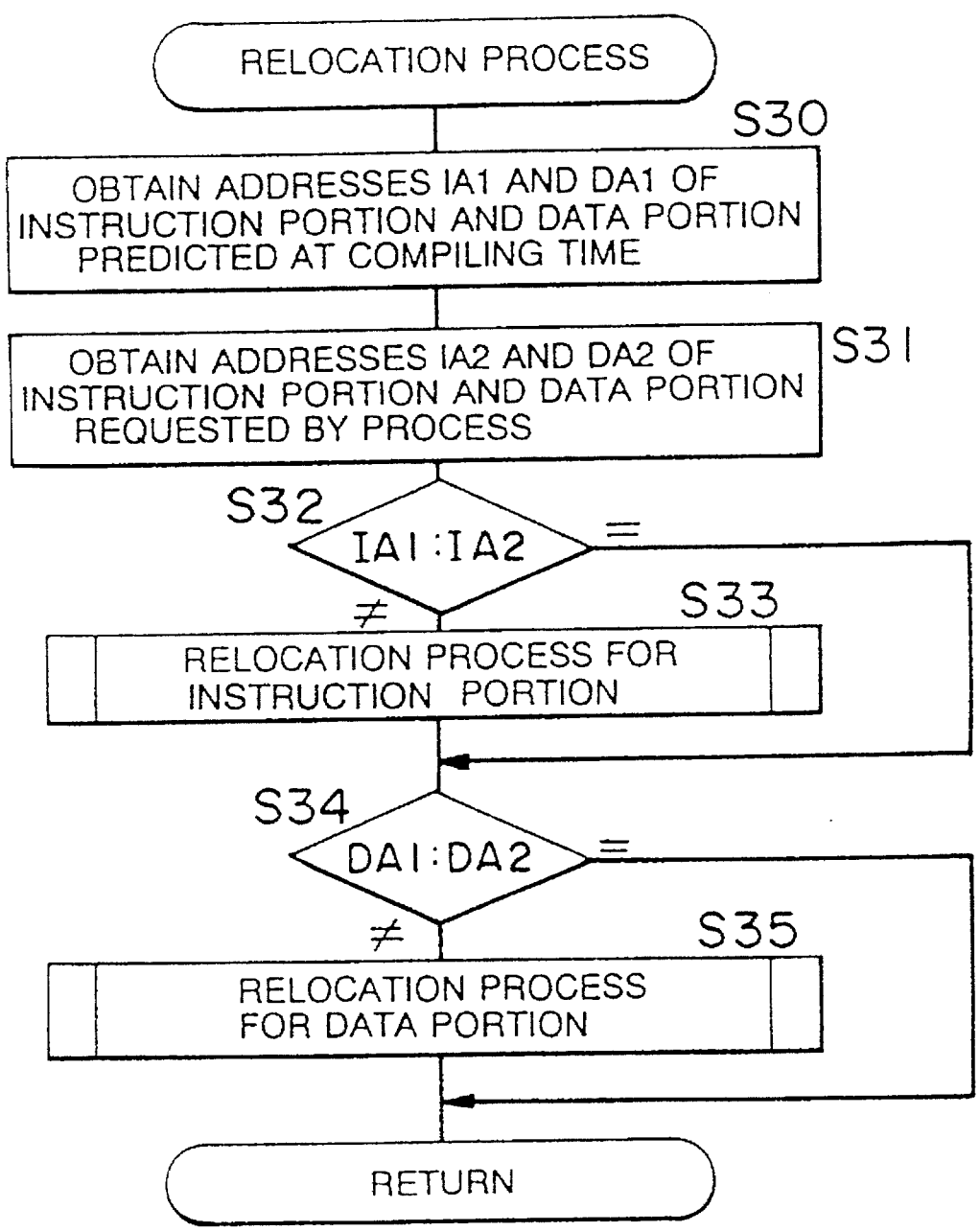
FIG. 7 is a flowchart illustrating the subroutine of a relocation process, which is executed in steps S08 and S14 in FIG. 5.

FIG. 7 presents the flowchart which illustrates the detail of the subroutine for relocation that is executed in steps S08 and S14 in the flowchart in FIG. 5.

In this subroutine, the address IA1 of the instruction portion of the program in the process space 2a, at which the head of the instruction portion is assumed to be located when the program is compiled in the process space 2a, is read first. Likewise, the address DA1 of the data portion of the program in the process space 2a, at which the head of the data portion is assumed to be located is read (step S30). It is to be noted that if relocation has been executed in the previous invoking process for this program, the addresses after the relocation becomes the addresses IA1 and DA1 used in this subroutine.

Then, the address IA2 of the instruction portion and the address DA2 of the data portion that are requested by the process are detected (step S31). As those addresses IA2 and DA2 become the addresses IA1 and DA1 in the next invoking process, those addresses should be stored in the control table 23. The instruction-area address data 42 in the control table 23 stores this address IA1 (previous IA2) and the data-area address data 43 stores this address DA1 (previous DA2).

Next, the address IA1 is compared with the address IA2 (step S32). When both addresses differ from each other, the relocation of the instruction portion is executed (step S33). When both addresses are the same, the process in step S33 is skipped.

Next, the address DA1 is compared with the address DA2 (step S34). When both addresses differ from each other, the relocation of the data portion is executed (step S35). When both addresses are the same, the process in step S35 is skipped. Then, the flow leaves this subroutine in FIG. 7.

Figure 8:
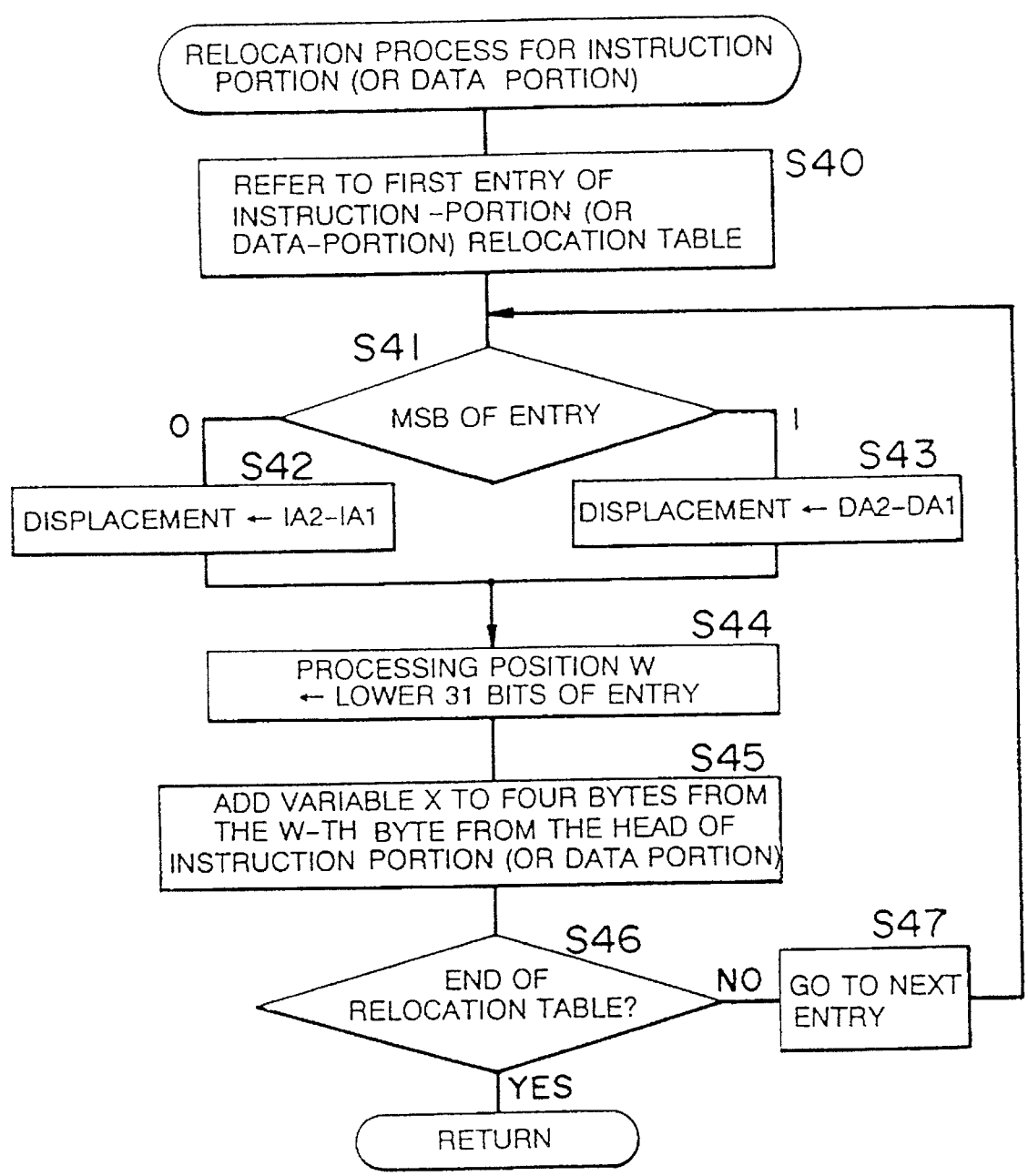
FIG. 8 is a flowchart illustrating the subroutine of an instruction portion (or data portion) relocation process, which is executed in steps S33 and S35 in FIG. 7.

FIG. 8 presents the flowchart illustrating the detail of the subroutine of relocation of the instruction portion (or data portion) that is executed in steps S33 and S35 in the flowchart in FIG. 7. When this subroutine is called in step S33, this relocation process is executed on the instruction portion while when this subroutine is called in step S35, this relocation process is executed on the data portion.

In this subroutine, first, the first entry in the instruction-portion (or data-portion) relocation table shown in FIG. 14 is referred to (step S40).

It is then checked whether the most significant bit (MSB) of the currently referred entry is "0" or "1" (step S41). When the MSB is "0," which means that the relocation data is for the instruction portion, the value of "IA2–IA1" is set to the value of a "variable X" (step S42). When the MSB is "1," which means that the relocation data is for the data portion, the value of "DA2–DA1" is set to the value of the "variable X" (step S43).

Then, the value of the lower 31 bits of this entry is set to the value of a "processing position W" (step S44).

Next, the "variable X" is added to the value of four bytes from the "W"-th byte from the head of the instruction portion (or data portion) (step S45).

It is then checked if the process has progressed to the last entry of the relocation table (step S46). If the process has not reached the end yet, a reference target is shifted to the next entry (step S47) after the flow returns to step S41. When the process reaches the last entry of the relocation table by repeating the loop (step S46), the flow leaves the subroutine in FIG. 8.

Figure 9:
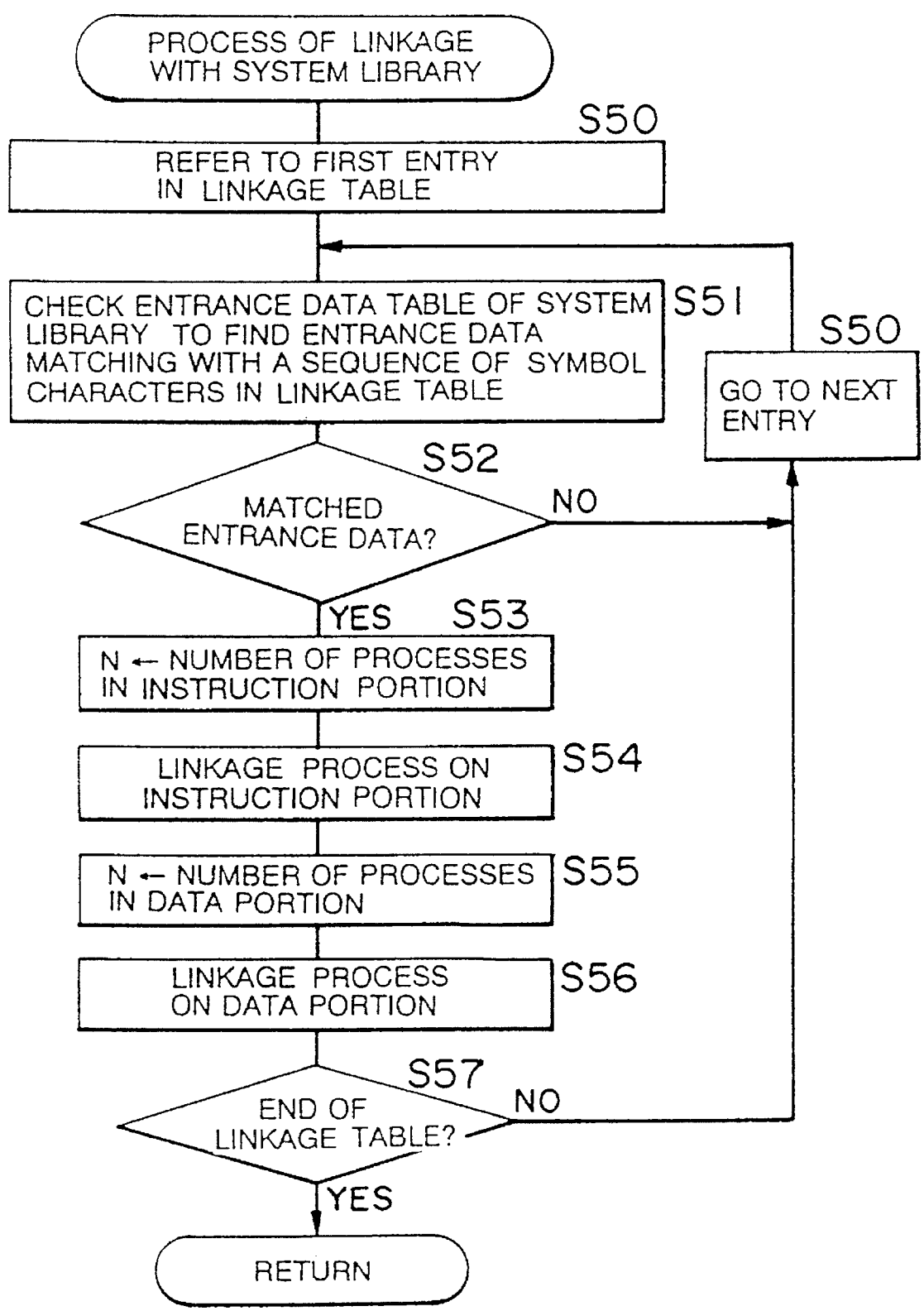
FIG. 9 is a flowchart illustrating the subroutine of a process for linkage a program to a system library, which is executed in step S10 in FIG. 5.

FIG. 9 presents the flowchart which illustrates the detail of the subroutine for coupling with the system library A that is executed in step S10 in the flowchart in FIG. 5.

In this subroutine, first, the first entry in the coupling table shown in FIG. 18 is referred to (step S50).

Then, the entrance data table for the system library shown in FIG. 19 is checked. That is, a search is made for the entrance data having a sequence of symbol characters that match with the sequence of symbol characters stored in the entry which is the current reference target in the linkage table (step S51). When there is no matched entrance data, the next entry in the coupling table becomes the reference target (step S58) after which the flow returns to step S51.

When there is matched entrance data, the number of processes in the instruction portion described in the coupling table is set to the value of a "variable N" (step S53). Subsequently, the linkage process is performed on the instruction portion (step S54).

Next, the number of processes in the data portion described in the linkage table is set to the value of the "variable N" (step S55). Subsequently, the coupling process is performed on the data portion (step S56).

It is then checked if the process has progressed to the last entry of the coupling table (step S57). If the process has not reached the end yet, a reference target is shifted to the next entry in the linkage table (step S58) after which the flow returns to step S51.

When the process reaches the last entry of the relocation table by repeating the loop (step S57), the flow leaves the subroutine in FIG. 9.

Figure 10:
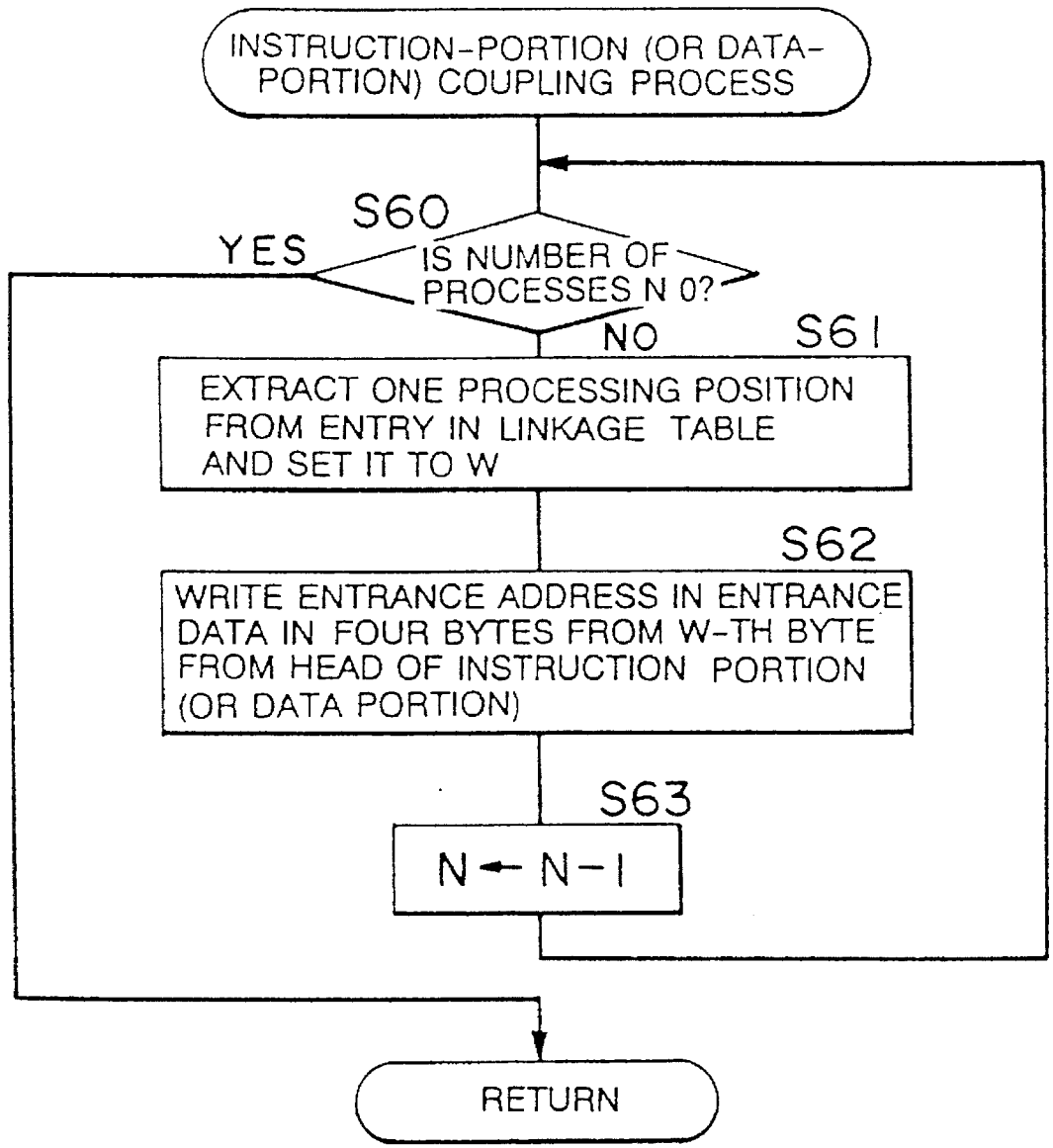
FIG. 10 is a flowchart illustrating the subroutine of an instruction portion (or data portion) coupling process, which is executed in steps S54 and S56 in FIG. 9.
Figure 11:
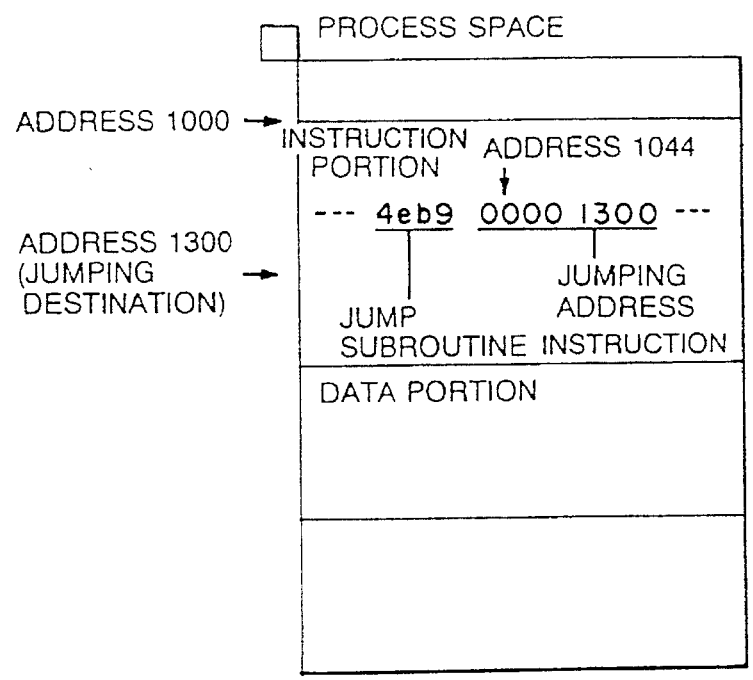
FIG. 11 is an explanatory diagram showing a process space when a relocation process in the second embodiment is unnecessary.
Figure 12:
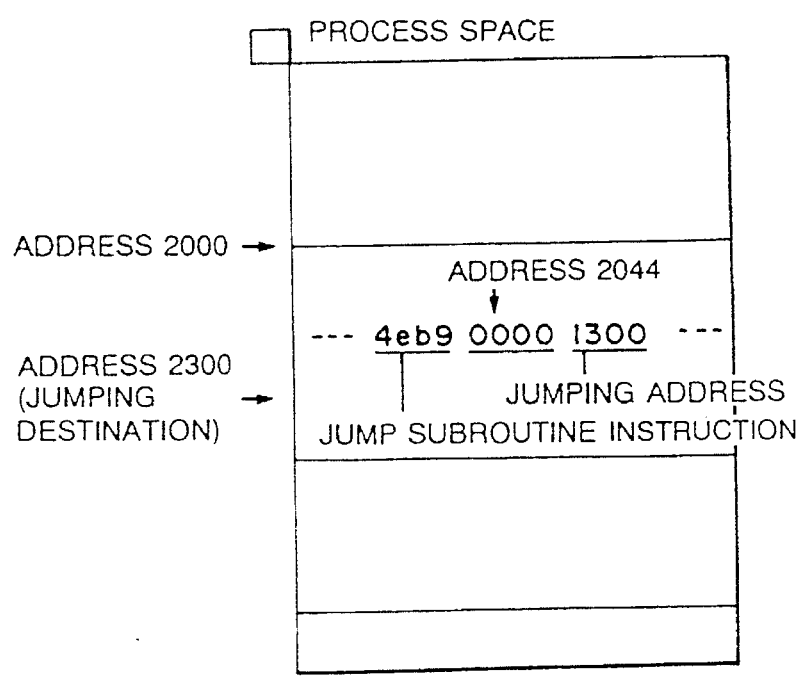
FIG. 12 is an explanatory diagram showing a process space when a relocation process in the second embodiment is needed.
Figure 13:
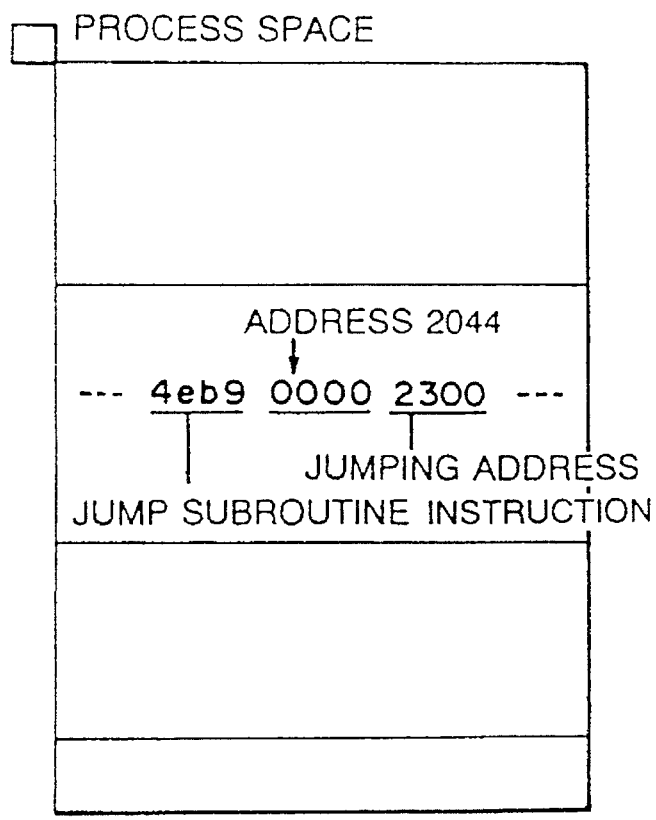
FIG. 13 is an explanatory diagram showing a process space after relocation in the second embodiment.

FIG. 10 presents the flowchart which illustrates the detail of the subroutine for linkage with the instruction portion (or data portion) that is executed in steps S54 and S56 in the flowchart in FIG. 9. When this subroutine is called in step S54, this process is executed on the instruction portion, whereas when this subroutine is called in step S56, this process is executed on the data portion. In this subroutine, it is checked first if the number of processes N becomes "0" (step S60). When the flow enters this step for the first time, the number of processes "N" that has been set in step S53 or step S55 is checked.

When the number of processes "N" is not "0," one processing position is extracted from the entry which is the current processing target in the linkage table and is set to a variable "W" (step S61).

Then, the entrance address included in the entrance data found in step S51 is written in the four bytes from the "W"-th byte from the head of the instruction portion (or data portion) (step S62).

Next, N decremented by 1 becomes a new N (step S63), after which the flow returns to step S60.

When the number of processes "N" become "0" by repeating the loop (step S60), the flow leaves the subroutine in FIG. 10.

Figure 20:
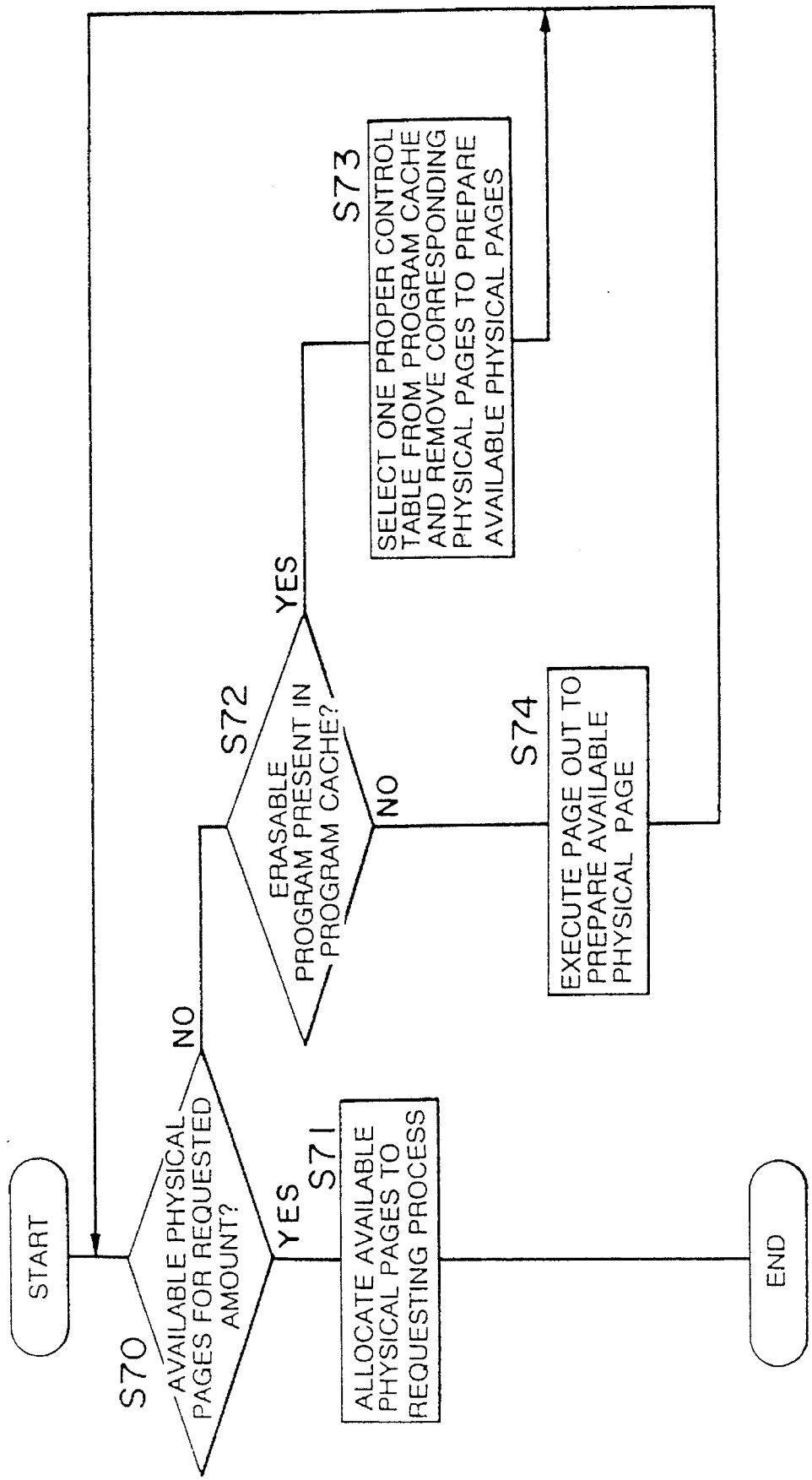
FIG. 20 is a flowchart illustrating a process when an arbitrary process requests acquirement of a physical page in the program cache apparatus according to the second embodiment.

When the acquirement of the physical page 48 is requested from an arbitrary process while the system is running, the process illustrated in FIG. 20 is executed. In this process in FIG. 20, the same processing as done in step S20 and steps S24 to S27 in FIG. 6 is performed.

More specifically, it is checked if there are available physical pages 48 for the amount requested by the process (step S70). If sufficient physical pages 48 are not available for the requested amount, it is checked whether or not an erasable program exists in the program cache space 24 (step S72). If there is an erasable program, the flow proceeds to step S73. In this step S73, one of the control tables 23 linked to the end of the control table in-use list 21 is selected. Then, all the physical pages 48 mapped in the program cache space 24 in association with the control table 23 (those physical pages which are mapped in the program cache space 24 but cannot be referred to from this space 24) are all freed to prepare available physical pages. Further, the selected control table 23 is removed from the inside-hash-structure sublist 47 and the control table in-use list 21 and is linked to the available control table list 20.

When there are no erasable programs (step S72), page out is executed to provide an available physical page 48 (step S74). The page out returns the physical page, which is stored in the memory 2 but is not relatively used, to the external storage device 1 regardless of its storage position in the logical space, thereby providing an available physical page 48.

After the processing in step S73 or step S74 is completed, the flow returns to step S70. Even if one control table 23 is erased or page out is executed, therefore, a sequence of processes in those steps S72 to S74 is repeated when the available physical pages are still insufficient.

When sufficient available physical pages 48 for the requested amount are obtained through the above processing, or when there are sufficient available physical pages 48 from the beginning (step S70), the available physical pages 48 are mapped in the process space 2a of the requesting process. Thereafter, the process in FIG. 20 is terminated.

When a program present in the program cache space 24 is erased or renewed while the system is running, the hash table 22 is searched in accordance with the position-in-device ID data 27 described in the control table 23 corresponding to this program. Only when this program is found, the corresponding program is erased from the program cache space 24. That is, the association of the program with the physical page 48 is reset to prepare an available physical page 48. After the erasure, the control table 23 is returned to the available control table list 20.

A description will now be given of a change in the relation among the program cache space 24, process space 2a and physical pages 48 when the program cache apparatus according to the second embodiment with the above-described structure, with reference to FIGS. 21 through 26.

Figure 21:
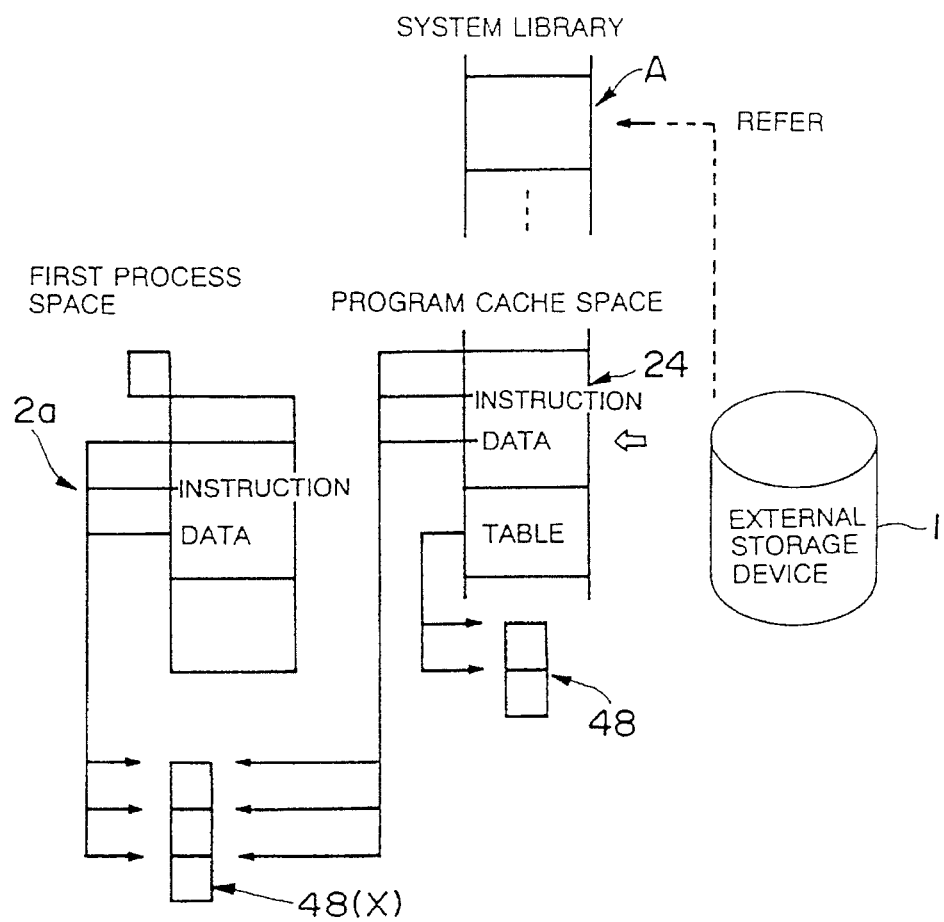
FIG. 21 is an explanatory diagram illustrating the operation of the second embodiment.

FIG. 21 shows the situation in which a program is initially invoked. In the situation shown in FIG. 21, when the first process request the invoking of a program, the OS checks the program cache space 24. When the program does not exist in the program cache space 24, new physical pages 48 are mapped in the program cache space 24. Further, the instruction portion, data portion and table portion of the program are loaded from the external storage device 1. At this point of time, relocation and linkage with the system library are executed in the program cache space 24 as needed. Of the physical pages 48, only those physical pages 48 (X) where the instruction portion and data portion are written are mapped in the process space 2a for the first process by setting for copy-on write. Thereafter, the physical pages 48 (X) are removed from the program cache space 24. At this time, the physical pages 48 (X) are simply rendered unreferable and their association with the program cache space 24 is not reset. In addition, the physical pages 48 are not removed. When linkage specific to the first process is executed, or when address data studded in the instruction portion and data portion of the program in the first process space 2a are rewritten to link this program with another program already loaded into the first process space 2a, this rewriting is to be conducted in the process space 2a at this point of time.

Figure 22:
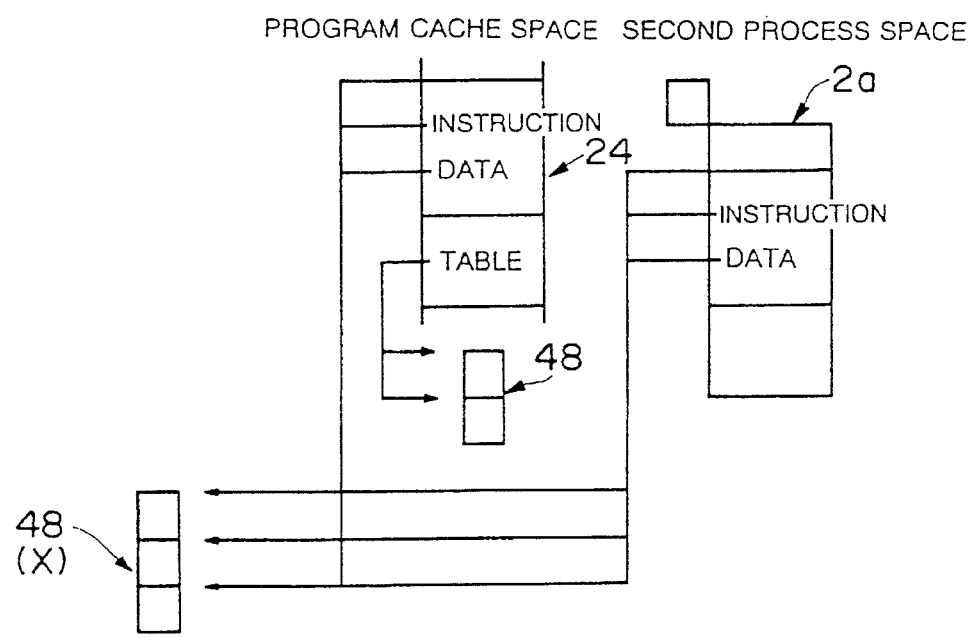
FIG. 22 is an explanatory diagram illustrating the operation of the second embodiment.

FIG. 22 shows the situation in which the program is invoked again. No consideration is given to the affinity between the first process space 2a and the second process space 2a. When the invoking of the same program as the previously invoked program in the second process space 2a is requested, the physical pages 48 (X) are remapped in the program cache space 24 by setting for copy-on write. Since the association of the physical pages 48 (X) with the program cache space 24 is not actually released, reference to the physical pages 48 is simply enabled and the setting for copy-on write is simply conducted. No loading from the external storage device 1 is therefore carried out. When the address of the program in the process space 2a at the re-invoking time differs from the address at the previous invoking time, relocation is performed in the program cache space 24. If those addresses are the same, however, no relocation is executed. Then, the physical pages 48 (X) are mapped in the process space 2a for the second process by setting for copy-on-write. Finally, the physical pages 48 (X) are removed from the program cache space 24. At this time, the physical pages 48 (X) are simply rendered unreferable and their association with the program cache space 24 is left in tact. In addition, the physical pages 48 are not removed. When linkage specific to the second process is executed, or when address data studded in the instruction portion and data portion of the program in the second process space 2a are rewritten to link this program with another program already loaded into the second process space 2a, this rewriting is to be conducted in the second process space 2a at this point of time.

When the program is invoked again with the same address in the process space 2a, the same physical pages 48 as used at the initial invoking time are used. This always prevents the physical pages 48 from being used double for the caching purpose, thus improving the efficiency of using the memory 2. In other words, the physical pages 48, which have been relocated and coupled with the system library at the initial invoking time are also used when the program is re-invoked. Therefore, the same relocation as done at the initial invoking time should not necessarily be repeated at the time the program is re-invoked, thus preventing the physical pages 48 from being used double and improving the memory using efficiency. The same advantages are available in the case where the invoked program is linked to the system library A. That is, the physical pages 48 are not used double for the caching purpose. Further, the same processing as done at the initial invoking time need not be repeated at the re-invoking time, resulting in further improved efficient memory usage.

Figure 23:
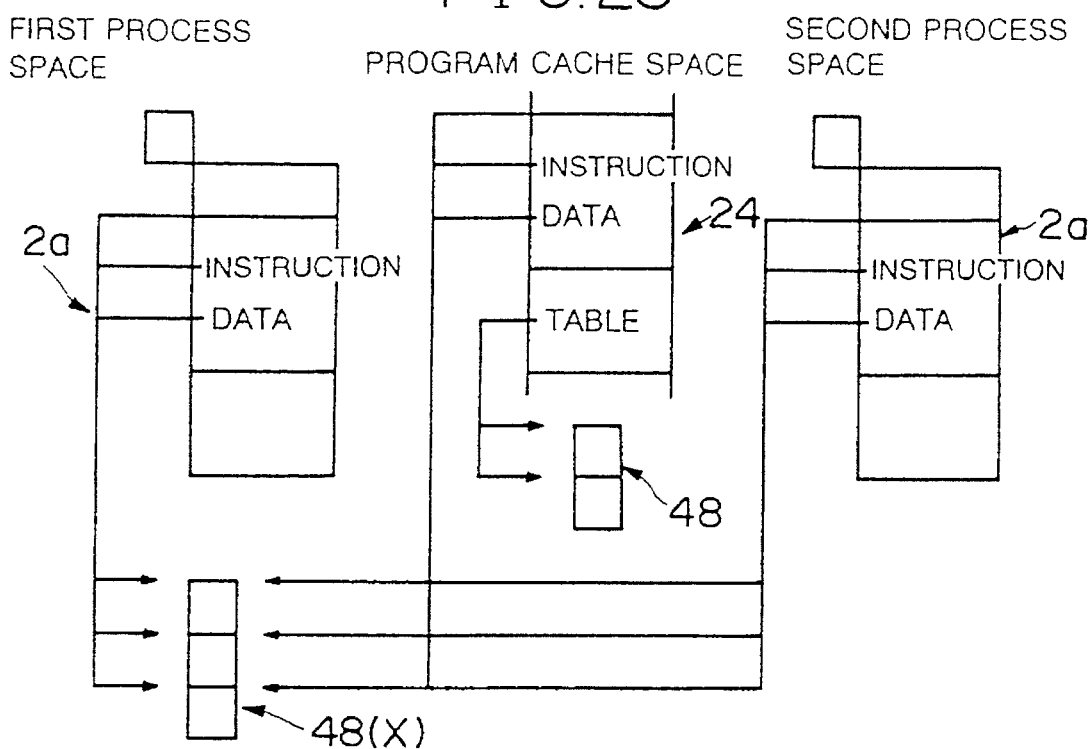
FIG. 23 is an explanatory diagram illustrating the operation of the second embodiment.

FIG. 23 shows the case where the execution of the program by the first process has not completed yet (the use of the physical pages 48 (X) has not been completed) at the time the program is invoked again by the second process and the current address in the process space 2a is the same as the address for the previous invoking of the program. In this case, the physical pages 48 (X) are shared by the first process space 2a, the second process space 2a and the program cache space 24.

Figure 24:
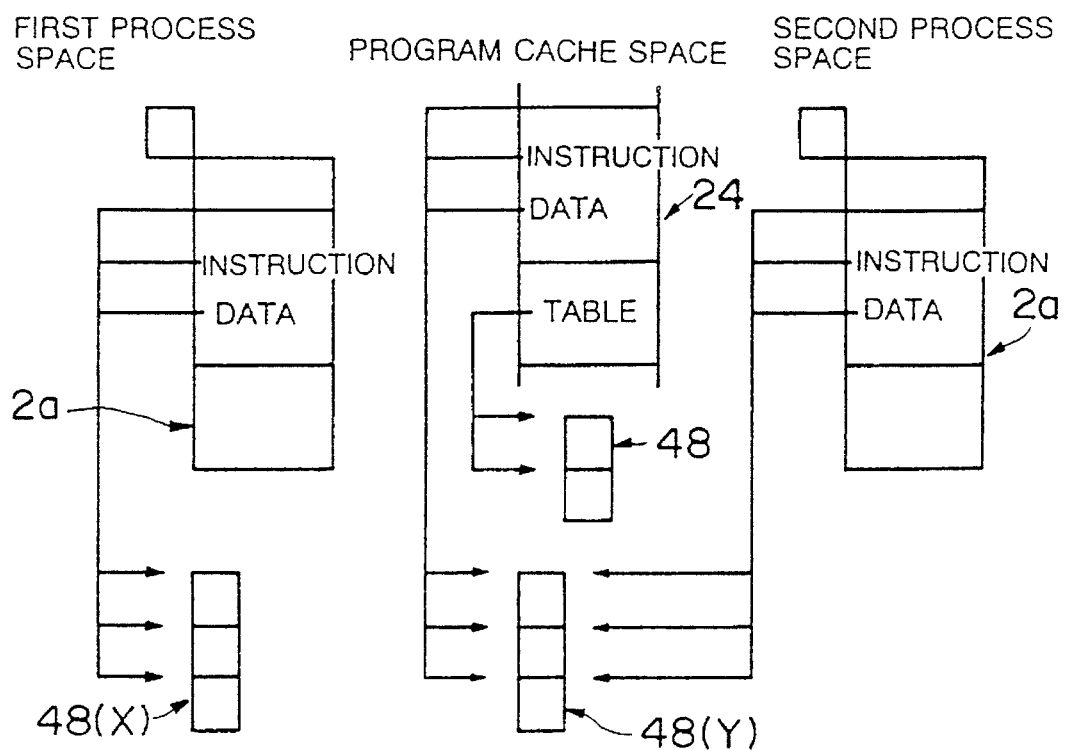
FIG. 24 is an explanatory diagram illustrating the operation of the second embodiment.

FIG. 24 shows the case where the execution of the program by the first process has not completed yet (the use of the physical pages 48 (X) has not been completed) at the time the program is invoked again by the second process and the current address in the process space 2a differs from the address for the previous invoking of the program. In this case, the physical pages 48 (X) are mapped in the program cache space 24 by setting for copy-on-write and copying is executed by copy-on-write after relocation, so that those physical pages 48 (X) become another physical pages 48 (Y). Thereafter, the physical pages 48 (Y) are mapped in the process space 2a for the second process.

Figure 25:
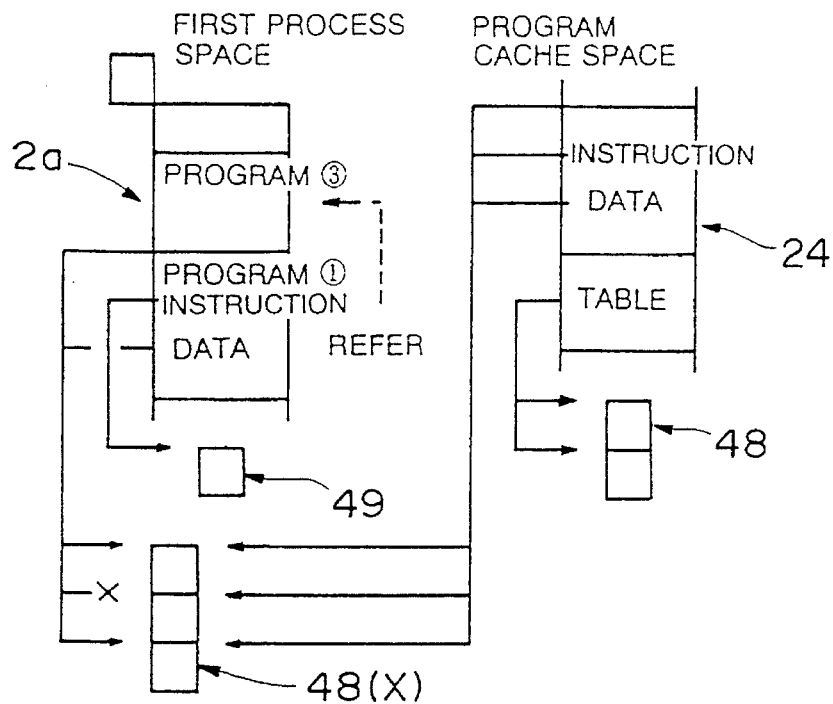
FIG. 25 is an explanatory diagram illustrating the operation of the second embodiment.

FIG. 25 shows the case where linkage specific to the process is executed, i.e., where to couple a program ③ already loaded in the first process space 2a with another program ① address data studded in the instruction portion and data portion of the program ① mapped in the second process space 2a are rewritten so as to refer to the instruction or data in the program ③. At this time, the physical pages 48 (X) corresponding to the program ① are mapped in the first process space 2a by setting for copy-on-write. Accordingly, the physical page 48 for a part corresponding to what has been rewritten by the linkage process specific to the process becomes another physical page 49 as copying by copy-on-write is executed.

Figure 26:
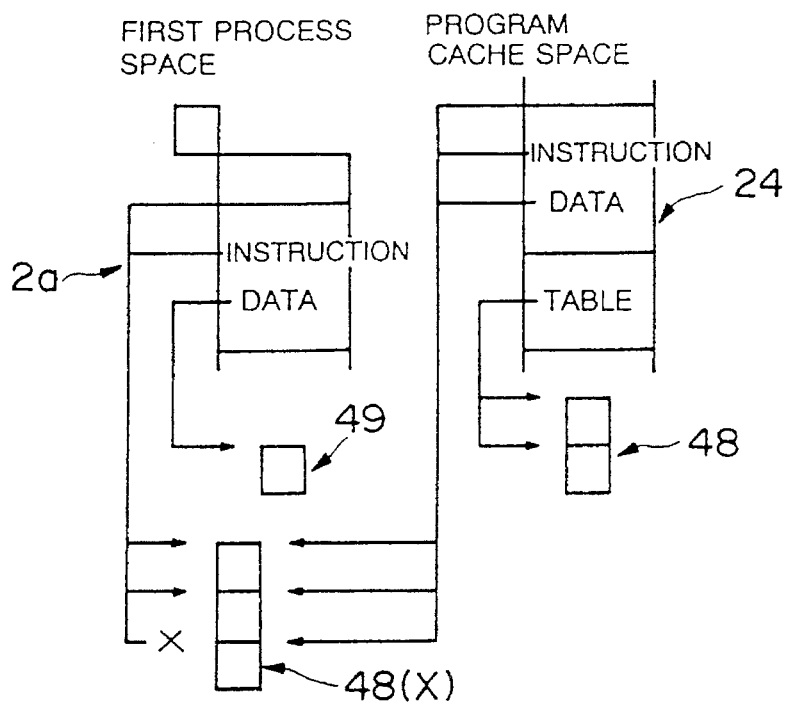
FIG. 26 is an explanatory diagram illustrating the operation of the second embodiment.

FIG. 26 shows the case where as an arbitrary process executes a program, data in this program mapped in the first process space 2a is rewritten. The physical page 48 corresponding to the rewritten data likewise becomes another physical page 49 when copying is executed.

According to the second embodiment, the physical page 48 is mapped directly in the process space 2a. In some actual case, the same program may be shared by the first process and the second process. In this respect, a mechanism for managing the invoked program may be provided so that the physical page 48 is mapped in the process space 2a through this mechanism.

The foregoing description of the second embodiment has not discussed the association with "page cache" that is conventionally executed. When control using the program cache may be performed only when relocation and linkage with the system library are necessary, whereas control using the page cache may be performed when relocation and linkage with the system library are unnecessary. This design eliminates the need for loading the unnecessary portion in a program into the program cache space 24, thus ensuring efficient processing.

Third Embodiment

The objective of a third embodiment of this invention will be readily apparent from the following description. According to the conventional page cache system, if one program is invoked several times in a given processing period, the number of I/O processes to access an external storage device is reduced, thus ensuring fast processing. If one program is not invoked several times in a given processing period (e.g., the period from the point at which the program is temporarily written in the cache to the point at which the program is removed therefrom), however, such an effect cannot be expected. What is more, the program is not present in the cache during the period from the time the system is powered on to the time the program is executed for the first time, and even if the program is written in the cache as a result of being executed once, the program will be removed from the cache as programs to be executed subsequently are sequentially written in the cache. To execute this program under such a situation, the program should be loaded from the external storage device. In this case, if the external storage device is a mechanical scanning type storage device like a hard disk, an extra time is needed for the amount of head seeking besides the ordinary data transfer time. When many programs should be executed in a given processing period, in particular, as the number of programs increases, therefore, the seek overhead undesirably becomes greater. That is because those programs are normally located at separate positions in the external storage device. The third embodiment is designed to aim at overcoming this conventional problem.

The third embodiment has the same structure as the above-described second embodiment and executes the same control as the second embodiment, with the exception that a save/restore file D is provided in the external storage device 1 in place of the save/restore file C in the second embodiment. This save/restore file D differs from the save/restore file C in its function. Further, the provision of the save/restore file D adds a process that is to be executed by the CPU 3 under the control of the OS.

Figure 27:
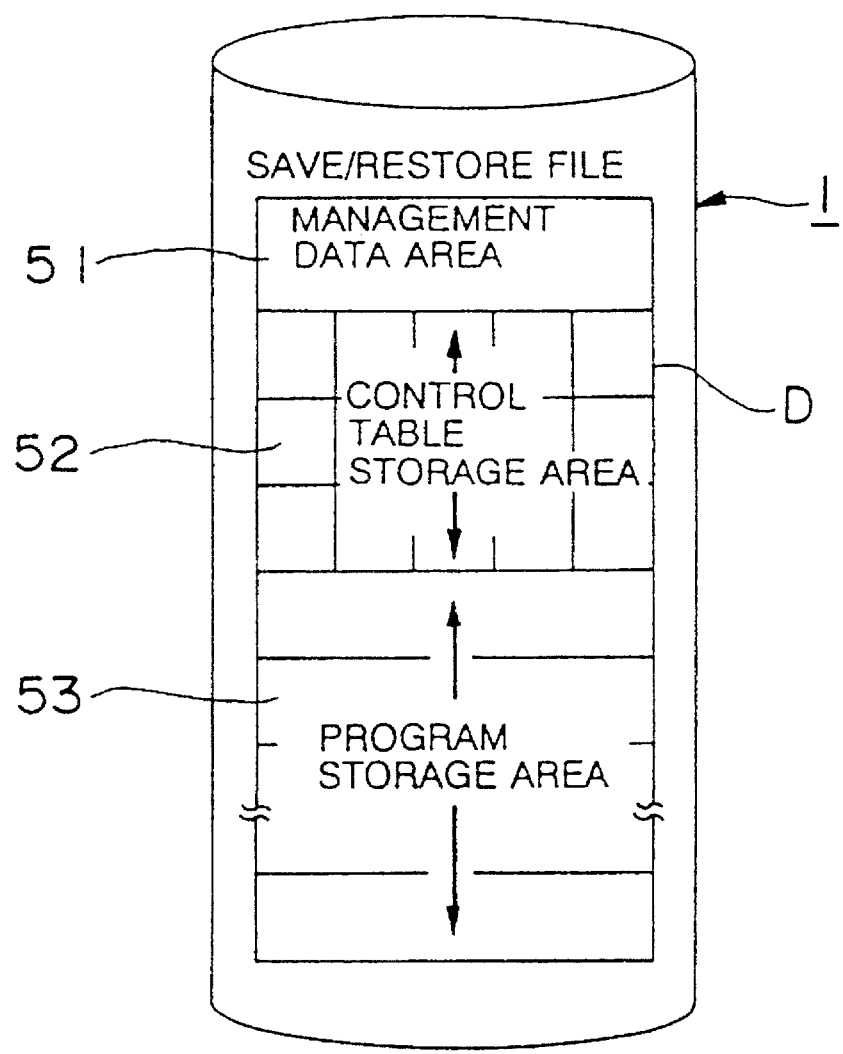
FIG. 27 is an explanatory diagram illustrating the structure of an external storage device in a program cache apparatus according to a third embodiment of this invention.

FIG. 27 shows the structure of the save/restore file D formed in physically consecutive memory locations in the external storage device 1. This save/restore file D has an management data area 51, a control table storage area 52 and a program storage area 53 in order from the head. The management data area 51 stores information, such as the number of programs to be stored in the save/restore file D and the number of pages in the program cache space 24 that are necessary to restore the programs. The control table storage area 52 stores the control tables 23 corresponding to all the programs that should be stored in the save/restore file D. The program storage area 53 stores programs associative with the control tables 23 stored in the control table storage area 52, in the same order as the storing order of the control tables 23 in the area 52. The save/restore file D is not prepared unless there are no programs to be stored in this file. When a computer is booted first time from one external storage device 1, therefore, the save/restore file D has not been prepared yet so that this file D is not present in the external storage device 1.

Figure 28:
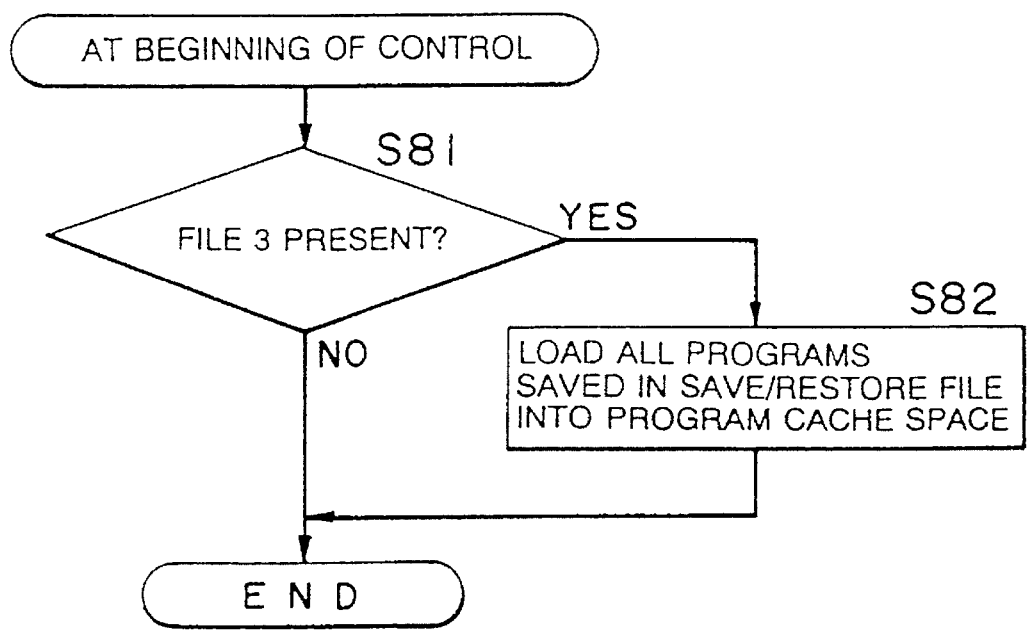
FIG. 28 is a flowchart illustrating a collective program restoring process that is executed at the beginning of an IPL control by the program cache apparatus according to the third embodiment.
Figure 29:
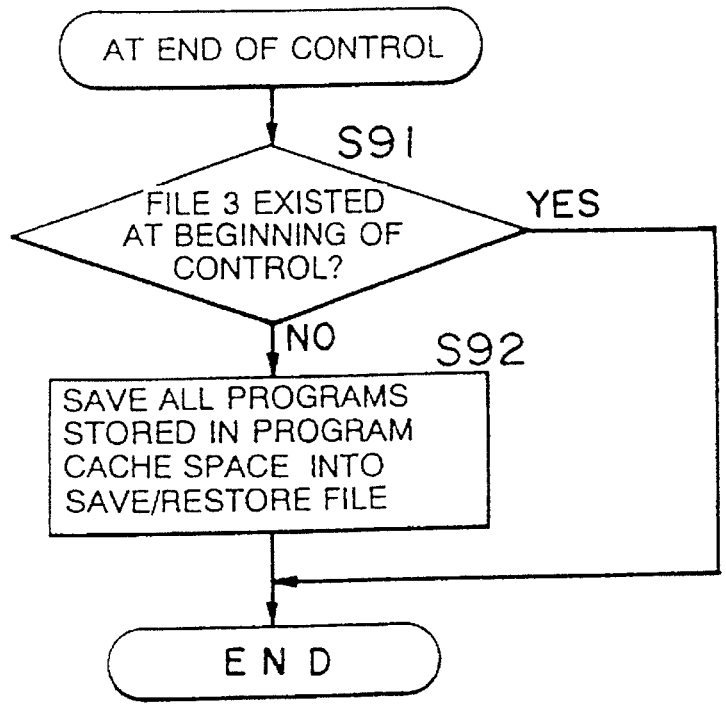
FIG. 29 is a flowchart illustrating a collective program saving process that is executed at the end of an IPL control by the program cache apparatus according to the third embodiment.

FIGS. 28 and 29 present the flowcharts that illustrate the detail of a process for the fast execution method added in the third embodiment. This process is executed by the CPU 3 under the control of the OS. The routine in FIG. 28 is executed at the beginning of IPL (Initial Program Loader) control. The routine in FIG. 29 is executed at the end of the IPL control. The IPL control is for loading a program first time at the time the computer is booted. Depending on the computer systems, more than 100 programs are successively executed within a given processing cycle (period) by this IPL control.

In the routine in FIG. 28 which is executed at the beginning of the IPL control, it is first checked in step S81 if the save/restore file D exists. When the computer is booted first time from the external storage device 1, or when the external storage device 1 is initialized, the save/restore file D is not present in the external storage device 1, as mentioned above. In this case, the routine is terminated without performing any step. In the IPL control that will be executed thereafter, therefore, the programs are sequentially loaded from the external storage device 1 and are executed.

Once the routine in FIG. 29 is executed, the save/restore file D is prepared in the external storage device 1. Therefore, in the routine in FIG. 28 that is executed thereafter, it is determined in step S81 that the save/restore file D exists. In this case, the flow proceeds to step S82.

In step S82, the management data area 51 in the save/restore file D is referred to. Then, the necessary number of control tables 23 for all the programs stored in this save/restore file D are acquired from the available control table list 20. If the available control table list 20 contains an insufficient number of control tables 23, however, the control table 23 is acquired one after another from the end of the control table in-use list 21. At the same time, the program corresponding to this acquired control table 23 is removed from the program cache space 24. The above manipulation is repeated until the necessary number of control tables 23 are secured. When the necessary number of control tables 23 are secured through the above processing, the contents for the control tables 23 are all read from the control table storage area 52 in the save/restore file D and are written in the individual control tables 23 secured in the system common space 2b. Then, the written control tables 23 are linked to the control table in-use list 21 and the hash table 22. The necessary number of physical pages 48 for writing all the programs retained in the save/restore file D are mapped in the program cache space 24. When the available physical pages 48 are insufficient, however, the same processing as done for the case of insufficient control tables 23 is executed to secure the necessary number of physical pages 48. The programs read from the program storage area 53 in the save/restore file D are written in the thus acquired physical pages 48 via the program cache space 24. Thereafter, of the management data in every already-written control table 23, the values of the instruction-area pointer 29, data-area pointer 32, linkage-data table pointer 35 and relocation-data pointer 28 are set to point the respective instruction area 30, data area 33, linkage data table 36 and relocation data table 39 in the program cache space 24.

After the process in the step S82 is completed, the routine in FIG. 28 is terminated. Under the IPL control that is executed thereafter, therefore, the programs which are collectively restored and written in the program cache space 24 in step S82 are sequentially executed.

In the routine in FIG. 29 which is executed at the end of the IPL control, it is first checked in step S91 if the save/restore file D has existed in the external storage device 1 at the beginning of the IPL control. If the save/restore file D has not existed, the flow proceeds to step S92. If the physical pages 48 had not become insufficient during the processing period of the IPL control, all the programs invoked during the processing period of the IPL control should have been stored in the program cache space 24 at the end of the IPL control. Thus, the save/restore file D is prepared in the external storage device 1 and all the programs stored in the program cache space 24 and all the contents of the control tables 23 corresponding to those programs are collectively saved into this save/restore file D in step S92. At the same time, other information is properly written in the management data area 51 after which the routine in FIG. 29 is terminate.

If it is determined in step S91 that the save/restore file D has existed at the beginning of the IPL control, the routine is terminated without executing any step because the save/restore file D is already present.

Referring now to the time chart in FIG. 30, a description will now be given of a change in the relation among the loading and execution of a program P, the storage of the program P in the program cache 24, the collective saving, collective restoring, and fast invoking, when the program cache apparatus according to the third embodiment with the above-described structure is used.

In FIG. 30, thick solid lines α and β indicate the processing cycle of the IPL control. The thick solid line α in phase 1 represents the operation when the IPL control is executed first time. In this case, the save/restore file D is not present in the external storage device 1 at the beginning of the IPL control. Therefore, the OS loads programs P, which are to be executed in the processing zone α from the external storage device 1 and executes them, and stores all the programs P into the program cache space 24. At the end of the IPL control, the programs P that have been invoked and stored in the program cache space 24 in the processing zone α are all saved together with their management data in the save/restore file D.

The thick solid line β in phase 2 represents the operation when the IPL control is re-executed. In this case, the save/restore file D is present in the external storage device 1 at the time the IPL control has restarted. Therefore, the OS stores all the programs P, already saved in save/restore file D, together with their management data in the program cache space 24. All or most of the programs which are executed in the processing zone β are located in the program cache space 24. Accordingly, the programs are not loaded from the external storage device 1 but the programs P are invoked from the space 24 and are subjected to the IPL control.

If the programs P that should undergo the IPL control or the operational environments for those programs P are changed, the save/restore file D currently present in the external storage device 1 is erased. In this case, the operation of the phase 1 for the initial stage is executed.

According to the third embodiment, as described above, even in a zone process in a given period of time, such as the IPL control under which many programs are invoked, single program loading from the external storage device 1 is sufficient. This eliminates any seeking that is caused when the individual programs are located at separate locations in the external storage device 1. Further, a single process suffices for the I/O request, thus reducing the processing load on the CPU 3. It is therefore possible to considerably shorten the time for the processing zone.

As described above, this fast operation is possible even the computer system is temporarily powered off unless the save/restore file D is erased.

Although IPL control is exemplified as the zone process for a given period in the foregoing description of the third embodiment, the control of the third embodiment may be applied to other zone processes as well.

According to the third embodiment, when the save/restore file D is not present in the external storage device 1 at the beginning of the IPL control in the processing zone, no processing is performed. At this point, however, all the control tables 23 may be removed from the control table in-use list 21 and all the physical pages 48 may be released from the program cache space 24. This modification allows the programs P, read from the external storage device 1, to be stored in the program cache space 24 at successive locations. This can simplify the process of saving the programs P in the save/restore file D.

Likewise, even when the save/restore file D is present in the external storage device 1 at the beginning of the IPL control in the processing zone, all the control tables 23 may be removed from the control table in-use list 21 and all the physical pages 48 may be released from the program cache space 24. This modification allows the programs P, read from the external storage device 1, to be collectively restored in the program cache space 24 at successive locations. This can simplify the process of loading the programs from the save/restore file D.

In short, the program cache apparatus embodying the present invention can minimize the double usage of memory caused by the copying of a physical page through the execution of copy-on write, thus improving the memory usage efficiency.

If a file for collectively storing all the programs stored in the program cache space is provided, the deterioration of the performance caused by dividing large-scale software consisting of numerous programs into a plurality of modules can be avoided, thus facilitating the divisional development of and the divisional maintenance of software.

This invention being thus described, it will be obvious that the same may be varied in same ways. Such variations are not to be regarded as a departure from the spirit and scope of the invention, and all such modifications would be obvious to one skilled in the art intended within the scope of the following claims.

What is claimed is:

1. A program cache apparatus comprising:

a first storage device storing a plurality of programs;

a second storage device having a plurality of physical pages given with respective physical addresses and a memory logical space serving as a set of logical addresses corresponding to said physical addresses, said memory logical space including a program cache space storing program read from said first storage device and a process space for storing a program to be executed;

a processing means for loading a program from said first storage device onto said physical pages and for accessing said program located on said physical page and stored in said process space to execute a specific process;

address-data changing means for altering data about addresses in said program stored in said second storage device; and management means for associating said physical addresses with said logical addresses in such a manner that after said address-data changing means alters said address data, said management means associates said physical address of said physical page corresponding to a program stored in said program cache space with a logical address in said process space.

2. The program cache apparatus according to claim 1, further comprising:

copy means for copying said program stored on said physical page onto another physical page when writing to said program is effected after said physical address is associated with said logical address in said process space by said management means.

3. The program cache apparatus according to claim 1, wherein said address-data changing means alters data about addresses included in said program in said program cache space.

4. The program cache apparatus according to claim 1, wherein said second storage device stores tables each describing a condition for rewriting said data about addresses, together with said program, in said program cache space; and said address-data changing means alters said data about addresses included in said program in said program cache space according to said tables stored in said program cache space.

5. The program cache apparatus according to claim 4, wherein said data about addresses represents addresses of subroutines or data described in other locations in said program.

6. The program cache apparatus according to claim 4, wherein said data about addresses represents addresses of subroutines or data stored in other locations in said memory logical space than a location where said program is stored.

7. The program cache apparatus according to claim 1, wherein said management means has write inhibiting means for inhibiting writing to said physical pages after associating said physical addresses with logical addresses in said process space.

8. The program cache apparatus according to claim 2, wherein when copying of said physical page is performed by said copy means, said management means associates a physical address of an original physical page from which copy has been made, only with a logical address in said program cache space, and associates a physical address of a new physical page created by said copying only with a logical address in said process space.

9. The program cache apparatus according to claim 1, wherein said memory logical space of said second storage device stores control tables each describing management data of a program stored in said program cache space.

10. The program cache apparatus according to claim 1, wherein said processing unit has a plurality of execution units and performs control according to said program for each of said execution units; and said second storage device has said process space for each of said execution units of said processing unit.

11. The program cache apparatus according to claim 5, wherein after said program is invoked once in said process space, when the same program is invoked in the same process space to associate with a different logical address from a logical address associated at a time said program is invoked first time, or when the same program is invoked in another process space to associate a physical address with a different logical address from a logical address associated at a time said program is invoked first time, said address-data changing means alters data about addresses in said program in said program cache space.

12. The program cache apparatus according to claim 1, wherein said first storage device has a file for collectively storing a plurality of programs stored in said program cache space in said second storage device; and said processing unit successively executes a plurality of predetermined programs within a given period of time, stores all said predetermined programs stored in said program cache space in the file when said given period of time elapses, and restores all said predetermined programs stored in said file into said program cache space when successively executing said plurality of programs.

13. The program cache apparatus according to claim 12, wherein said memory logical space of said second storage device stores control tables each describing management data of a program stored in said program cache space; and said file stores said control tables corresponding to said plurality of predetermined programs, together with said plurality of predetermined programs.

* * * * *